United States Patent [19]

Sawada et al.

[11] Patent Number: 5,103,739

[45] Date of Patent: Apr. 14, 1992

[54] APPARATUS FOR TRACKING AN OVERHEAD LINE AND AUTOMATICALLY MOVING AROUND OBSTACLES ON THE LINE

[75] Inventors: Jun Sawada, Musashino; Yoshinobu Ishikawa, Hino; Yoshikata Kobayashi, Hachioji; Yasuhiro Matsumoto, Fuchu, all of Japan

[73] Assignees: The Tokyo Electric Power Co., Inc., Tokyo; Kabushiki Kaisha Toshiba, Kawasaki, both of Japan

[21] Appl. No.: 545,656

[22] Filed: Jun. 29, 1990

[30] Foreign Application Priority Data

Jun. 30, 1989 [JP] Japan ................................. 1-166913
Feb. 28, 1990 [JP] Japan ................................. 2-45521

[51] Int. Cl.⁵ ............................................. B61C 7/06
[52] U.S. Cl. ...................................... 105/30; 104/112; 104/93; 105/150; 105/153; 901/1
[58] Field of Search ................... 104/87, 93, 112, 115, 104/116, 182, 187, 202, 204, 209, 211, 214, 215; 105/30, 134, 150, 151, 153; 901/1

[56] References Cited

U.S. PATENT DOCUMENTS

| 892,586 | 7/1908 | Ferlin | 104/87 |
|---|---|---|---|
| 3,439,628 | 4/1969 | Mendelson | 105/150 X |
| 3,498,236 | 3/1970 | Meek | 105/30 |
| 3,702,124 | 11/1972 | Highland | 104/112 X |
| 3,827,368 | 8/1974 | Garnier | 105/150 X |
| 4,163,480 | 8/1979 | Highland | 104/112 X |
| 4,760,798 | 8/1988 | Blengini | 104/209 |

FOREIGN PATENT DOCUMENTS 0200080 3/1983 Fed. Rep. of Germany ...... 105/150

OTHER PUBLICATIONS

"Robots Repair and Examine Live Lines in Severe Conditions", Electrical World, pp. 71-72, May 1989.
"A Wire Mobile Robot with Multi-Unit Structure", IEEE RSJ International Workshop on Intelligent Robots and Systems '89, Sep. 4-6, 1989, Tsukuba, Japan, pp. 414-421, Shin-ichi Aoshima(NTT) et al.
"Development of Electric Power Line Abnormal State Inspection Robot", Fujikura News, Dec. 1989.

Primary Examiner—Robert J. Oberleitner
Assistant Examiner—S. Joseph Morano
Attorney, Agent, or Firm—Oblon, Spivak, McClelland, Maier & Neustadt

[57] ABSTRACT

An apparatus for tracking an overhead line includes a carriage, an arm provided relatively movable on the carriage, a hook assembly provided at both end portions of the arm and for slinging the arm over the overhead line, a vertical/rotational motion shaft provided vertically movable and rotatably on the carriage, a wheel supporting arm provided on the top end portion of the vertical/rotational motion shaft swingably, a pair of wheels provided at both ends of the wheel supporting arm with an extension line of the vertical/rotational motion shaft being between the wheels, and a clamp member for clamping the wheels on the overhead line.

25 Claims, 32 Drawing Sheets

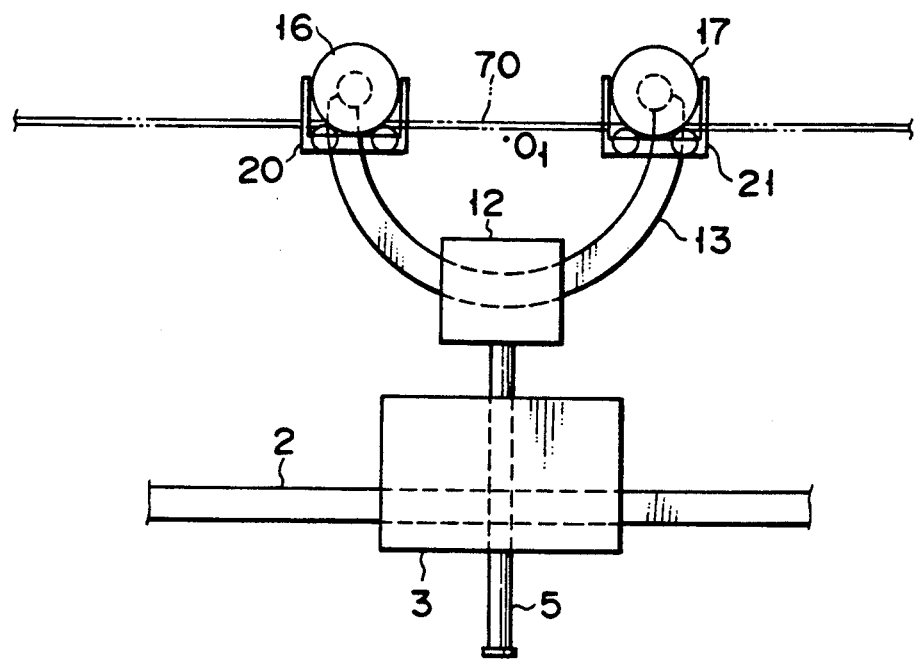
F I G. 14
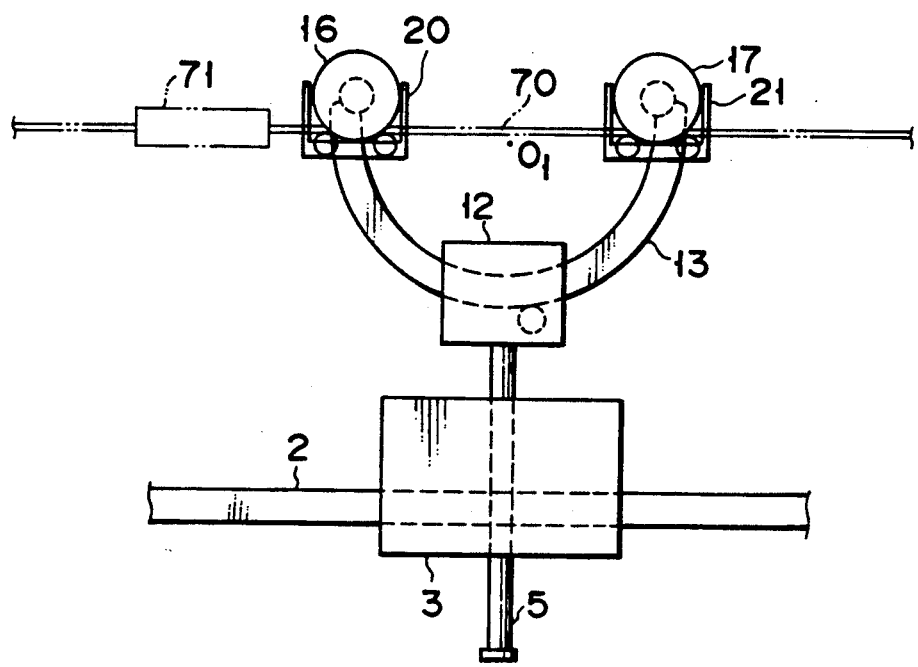
F I G. 15

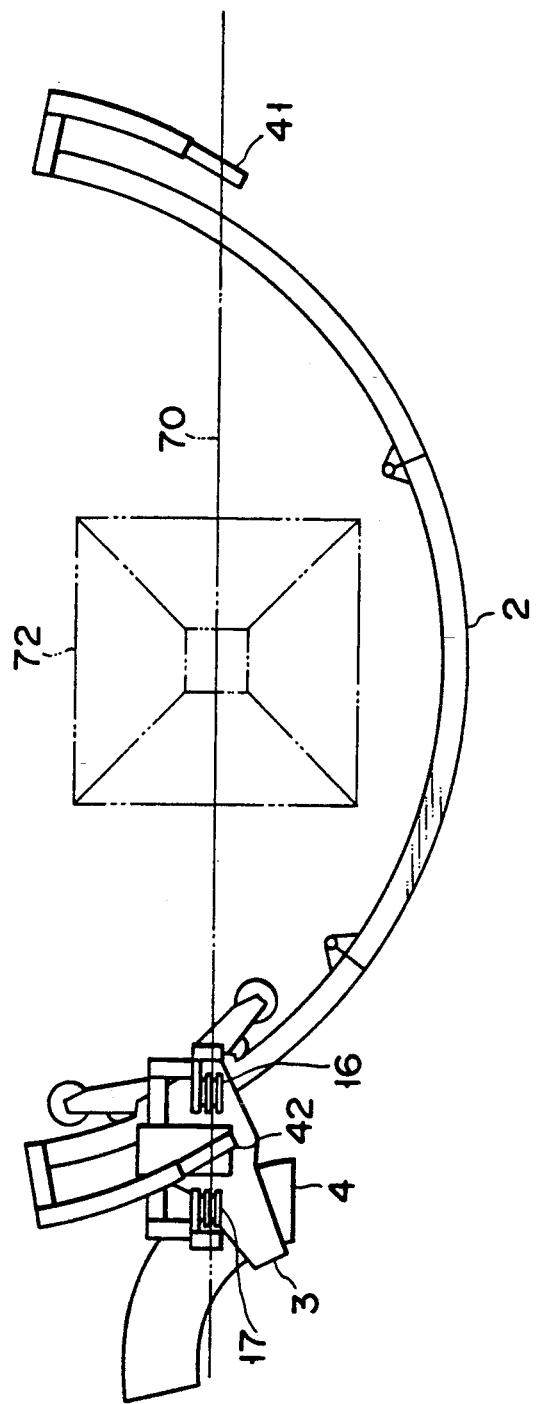
F I G. 21

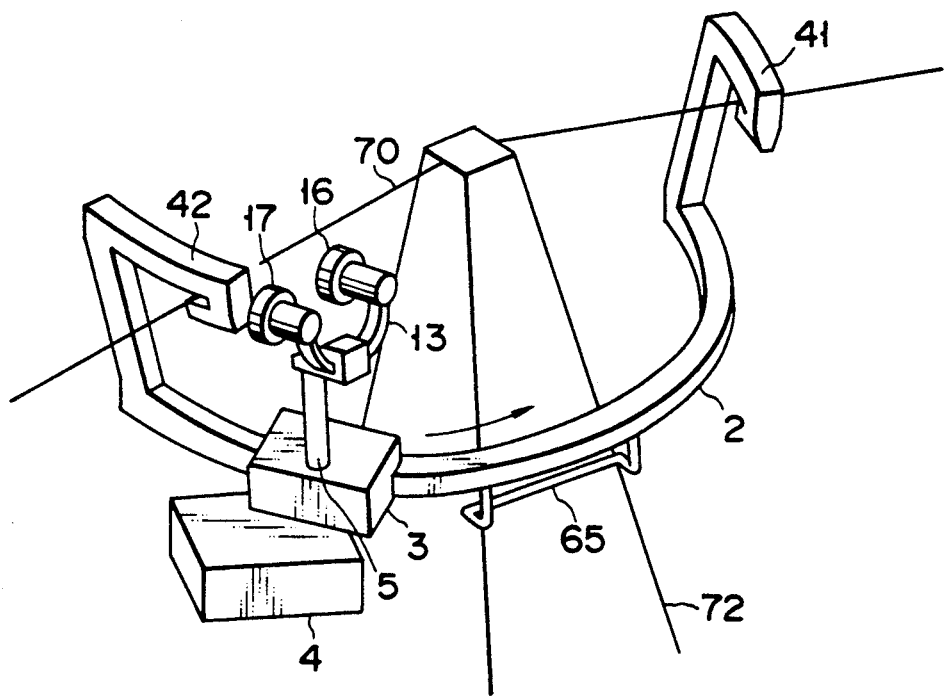
F I G. 22

(2)

```
WHEN THE MAIN BODY COMES
UP TO THE FRONT HOOK, THE
BALANCE RETURNS TO WELL-
BALANCED STATE AGAIN
```

```
CHANGES THE POSITION OF WHEELS PREVIOUSLY
CALCULATED FROM INFORMATION RELATING TO
THE TOWER IN ORDER TO PUT THE WHEELS
ON A GROUND WIRE
```

```
PROJECTS A GUIDE BAR ATTACHED TO CLAMP
MEMBER TO LOWER SIDE AND MAKES ROTATIONAL
SHAFT IN SERVO FREE STATE, THEREBY GUIDING
THE WHEELS ON THE OVERHEAD LINE
```

```
MAKES A VERTICAL/ROTATIONAL MOTION SHAFT
FOR DECIDING THE ANGLE OF TWO WHEELS
AGAINST OVERHEAD LINE IN SERVO FREE STATE,
THEREBY LETTING THE WHEELS FALL ON THE
OVERHEAD LINE
```

```
TIGHTENS UP THE CLAMP WHEEL
```

```
PULLS CABLE STRETCHED FROM HOOKS AT FRONT
AND BACK BY USING LOCK RELEASE MEMBER
ATTACHED TO MAIN BODY ITSELF AND DETACHES
CLAW AT FRONT AND BACK
```

(3)

F I G. 23C

③
↓

```
┌─────────────────────────────────────────────┐
│ DETACHES FRONT HOOK BETWEEN TWO WHEELS      │
└─────────────────────────────────────────────┘
                      │
┌─────────────────────────────────────────────┐
│ DETACHES BACK HOOK                          │
└─────────────────────────────────────────────┘
                      │
┌─────────────────────────────────────────────┐
│ DRAWS IN THE GUIDE RAIL                     │
└─────────────────────────────────────────────┘
                      │
┌─────────────────────────────────────────────┐
│ RUNS TO THE POSITION SUFFICIENTLY           │
│ APART FROM TOWER                            │
└─────────────────────────────────────────────┘
                      │
┌─────────────────────────────────────────────┐
│ ROBOT MAIN BODY DELIVERS GUIDE RAIL         │
│ TO JOINT THEREOF                            │
└─────────────────────────────────────────────┘
                      │
┌─────────────────────────────────────────────┐
│ DETACHES LOCK MEMBER OF JOINT BY            │
│ LOCK RELEASE MEMBER OF MAIN BODY            │
└─────────────────────────────────────────────┘
                      │
┌─────────────────────────────────────────────┐
│ JOINT OF GUIDE RAIL IS HUDDLED              │
│ UP BY THE FORCE OF SPRING                   │
└─────────────────────────────────────────────┘
                      │
┌─────────────────────────────────────────────┐
│ RUNS TOWARD NEXT TOWER                      │
└─────────────────────────────────────────────┘
                      │
                  (  END  )
```

F I G. 23D

APPARATUS FOR TRACKING AN OVERHEAD LINE AND AUTOMATICALLY MOVING AROUND OBSTACLES ON THE LINE

BACKGROUND OF THE INVENTION

1. Field of the Invention

The present invention relates to an apparatus for tracking an overhead line for the use of maintenance/inspecting of overhead lines such as a high-voltage power line and an overhead cable.

2. Description of the Related Art

Conventionally, the points to be repaired of the overhead line are visually found by a patrol-man riding on a helicopter or an automobile for instance, and then repaired by a serviceman coming from the ground.

In another method, a wire rope used for a ropeway or a ski lift is stretched alongside the overhead line, with a maintenance/inspecting apparatus being slung by means of a support arm over the wire rope and transferred by hauling the rope.

The former method, however, had a disadvantage that accurate checking is difficult due to the partial observation from only one direction as well as the long distance from the helicopter or automobile to the overhead line. On the other hand, the latter had a drawback that it required an enormous cost of construction and is uneconomical owing to the wire rope to be stretched alongside the overhead line.

Therefore, in order to solve this problem, there has been conceived a self-running maintenance/inspecting apparatus which is capable of unmanned travel on the overhead line.

The self-running maintenance/inspecting apparatus has a traction unit with a pair of moving wheels which is slung over the overhead line. In this case, the traction unit is movable with the overhead line being clamped between the moving wheels and clamp wheel located below the moving wheels. To the traction unit, is coupled a defect detection unit which is mounted with a sensor and a recording device thereon so as to inspect the overhead line.

A tower usually supporting the overhead line such as a power line, is disadvantageously an obstacle to the damper or counterweight of the self-running maintenance/inspecting apparatus. However the apparatus could not detour around the tower since it is moved with the overhead line being clamped between the moving wheels and clamp wheel. It was also impossible for the apparatus to climb over the cable holding metal fittings such as strain insulators and clamps attached to the overhead line. Consequently the above-mentioned self-running maintenance/inspecting apparatus required complicated work such as sling-change of the tracking apparatus every short section of line, thereby deteriorating the maintenance/inspecting work efficiency.

SUMMARY OF THE INVENTION

It is an objective of the present invention to provide an apparatus for tracking an overhead line which is capable of detouring the tower as well as climbing over the cable holding metal fittings such as strain insulators and clamps attached to the overhead line, and which is continuously capable of carrying an inspecting/monitoring unit such as television camera alongside the overhead line.

In accordance with the present invention, the apparatus for tracking the overhead line comprises a main body, an arc-shaped arm (guide rail) provided relatively movably with respect to the main body, a hook assembly connected to the both end portions of the arm and adapted to sling the arm from the overhead line, a vertical/rotational motion shaft provided vertically movable and rotatably on the main body, a moving wheel support arm connected swingably to the upper portion of the vertical/rotational motion shaft, a pair of wheels disposed in a straight line intersecting with the extended axial line of the vertical/rotational motion shaft, either at an equal distance from the axial line, and a clamp assembly to clamp the running wheels on the overhead line.

The apparatus for tracking the overhead line of above constitution is capable of climbing over strain insulators and the metal fitting such as clamps attached to the overhead line by swinging toward and backward of the centroid of the apparatus by means of the moving wheel support arm. Furthermore, the arm and the hook assembly connected to the both end portions thereof can be utilized in order to detour the tower.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 14 through 17 depict the state when the robot is climbing over the obstacle on the overhead line;

FIGS. 19 through 22 represent the state when the robot is detouring the tower;

FIG. 23A to 23D show a flowchart for explaining the operation for detouring the tower;

DETAILED DESCRIPTION OF THE PREFERRED EMBODIMENTS

Figure 1:
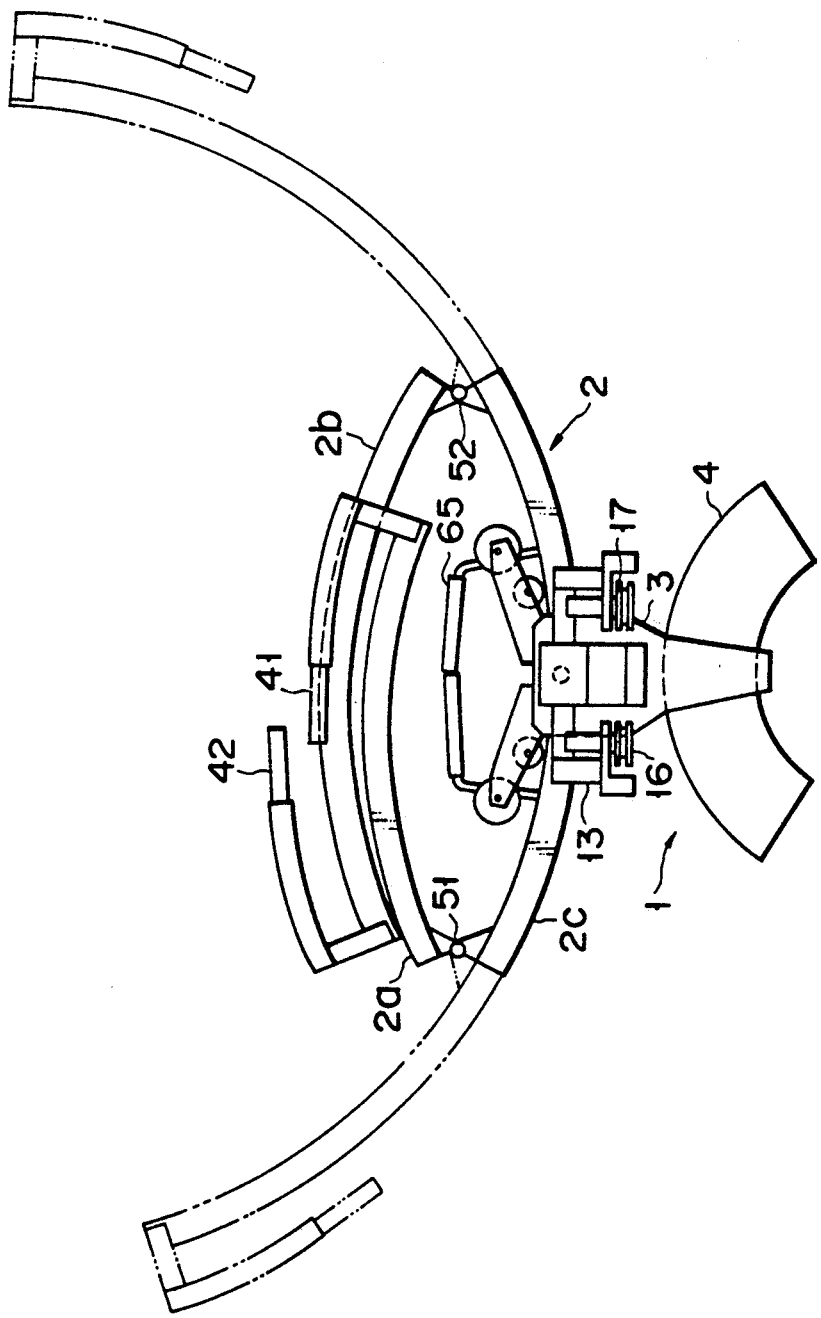
FIG. 1 is a plan view of an apparatus (a robot) for tracking an overhead line in accordance with an embodiment of the present invention.
Figure 2:
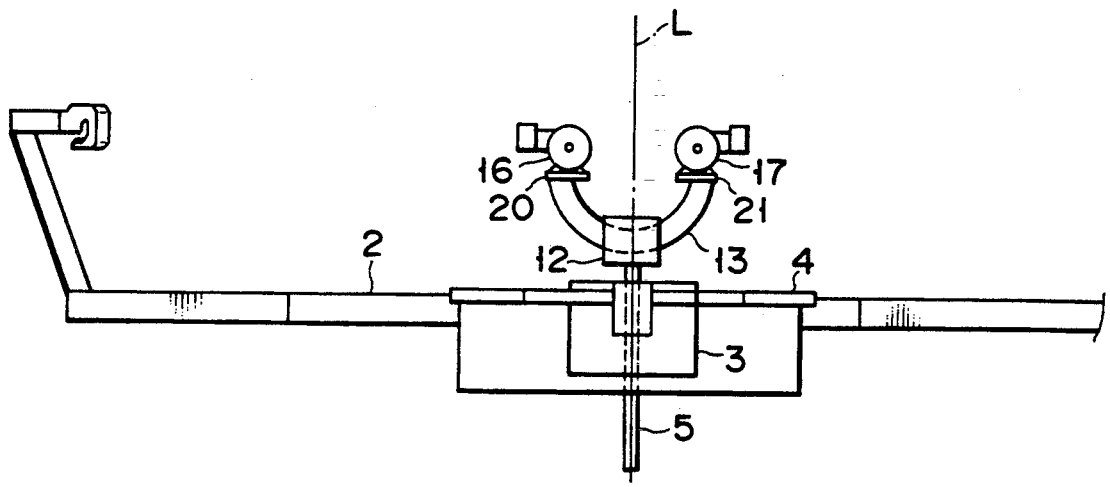
FIG. 2 is a front view of the apparatus for tracking the overhead line in FIG. 1.
Figure 3:
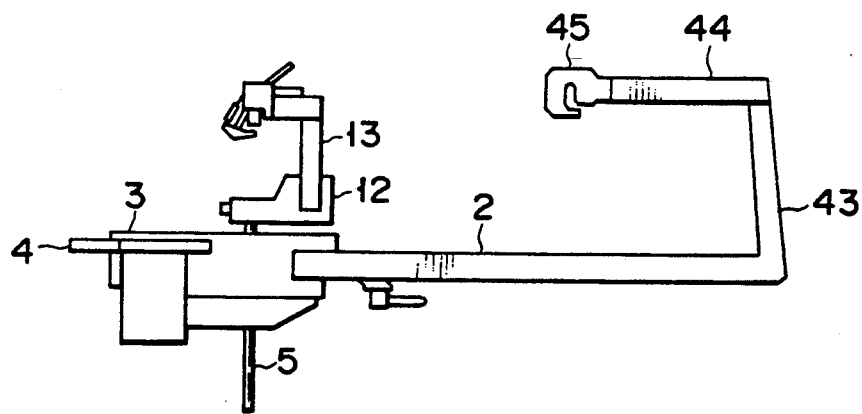
FIG. 3 is a side view of the apparatus for tracking the overhead line in FIG. 1.

Referring now to FIGS. 1 to 3, an embodiment of the invention is described in detail below.

Figure 4:
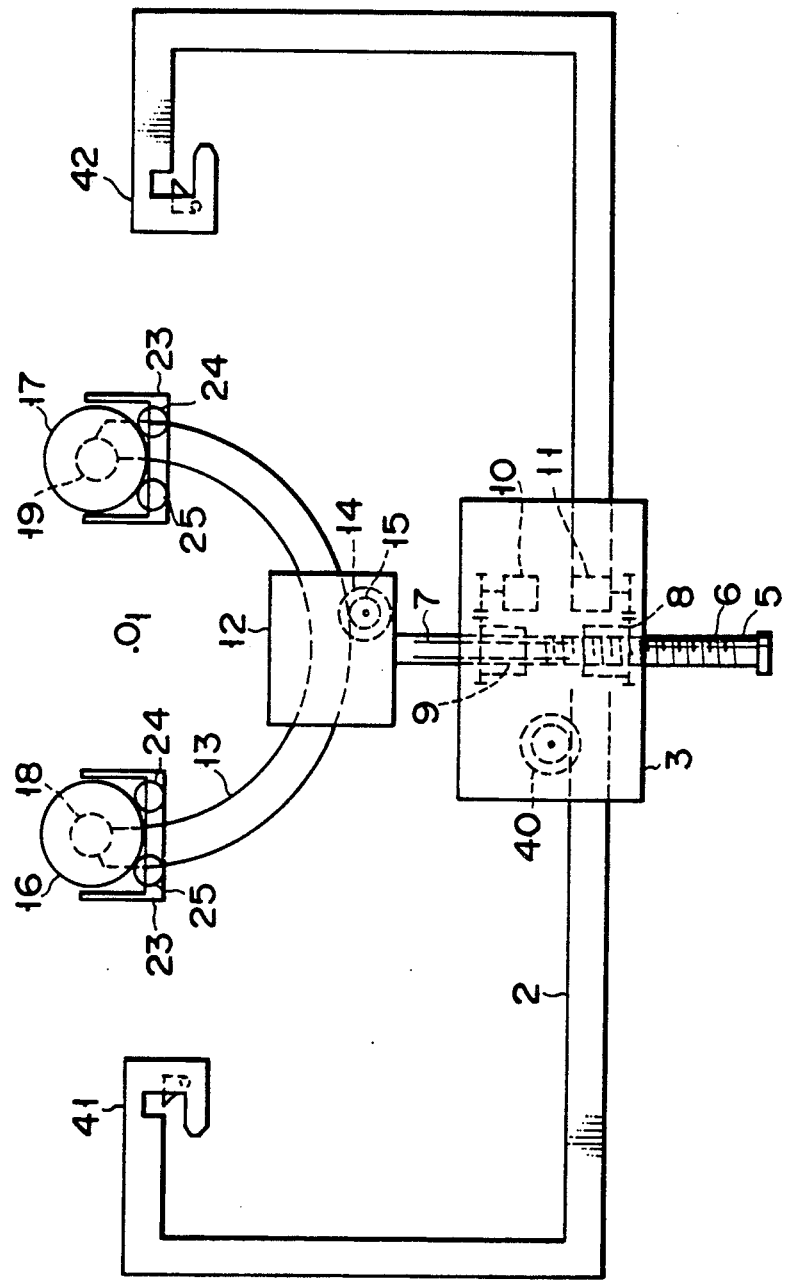
FIG. 4 is a schematic diagram of the robot.

The apparatus or robot for tracking an overhead line of the invention comprises a robot main body (or a carriage) 1 on which a checking/monitoring unit 3 such as television camera (that is, sensor) is mounted, and an arc-shaped arm (or guide rail) 2 disposed movably relatively to the carriage 1. The carriage 1 further includes a balancer 4 containing a controller, and a vertical/rotational motion shaft 5 provided in the center of the unit 3, and this shaft 5 penetrates through the unit 3 in the vertical direction so as to be free to rotate and move vertically. This vertical/rotational motion shaft 5 has a threaded part 6 and a spline 7 as shown in FIG. 4, and a nut 8 and a boss 9 to be engaged with such threaded part 6 and spline 7 which are driven by motors 10 and 11 through a gear or other transmission mechanism, so that the vertical/rotational motion shaft 5 can rotate and move up and down in the axial direction.

When the nut 8 and boss 9 are rotated at the same speed as the carrier 1, the vertical/rotational motion shaft 5 does not move up and down on the carriage 1 but only rotates, and when only the nut 8 rotates, the shaft 5 moves up and down without rotating. According to these movements, when the robot is suspended on an overhead line, that is, an overhead cable, the vertical/rotational motion shaft 5 does not move out the carriage 1 and arm 2 rotates or moves vertically on the shaft 5.

An inclining mechanism 12 is disposed at the upper end of the vertical/rotational motion shaft 5. On this inclining mechanism 12, a U-shaped or semicircular driven wheel holding arm 13 is supported so as to be rocked about a point O1 by a gear mechanism 15 linked with a motor 14 as shown in FIG. 4.

Figure 5:
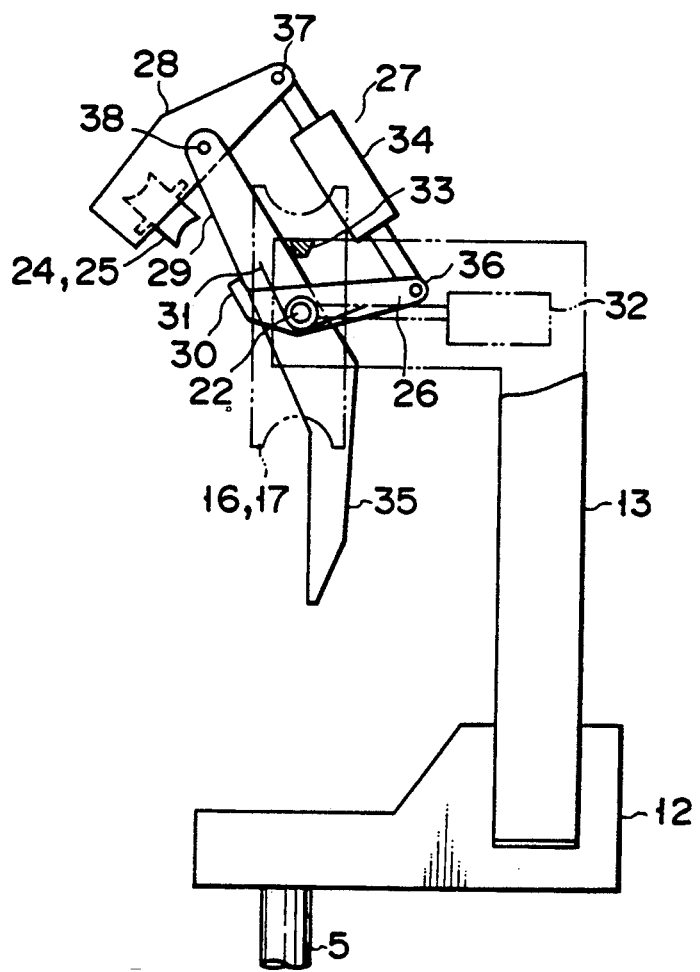
FIGS. 5 and 6 illustrate the constitution of a clamp assembly of the robot main body.
Figure 6:
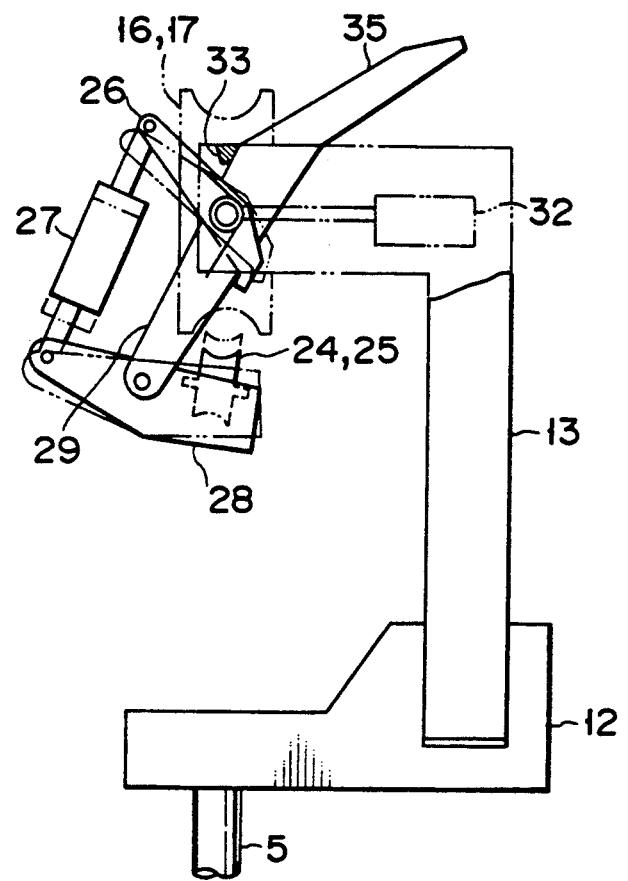

At both ends of the driven wheel holding arm 13, driven wheels 16 and 17 are rotatably disposed in a straight line intersecting with the extended axial line L of the vertical/rotational motion shaft 5, at an equal distance from the axial line L, and when these driven wheels 16 and 17 are driven by wheel driving mechanisms 18 and 19, the robot runs on the overhead line. At both ends of the driven wheel holding arm 13, clamp mechanisms 20 and 21 for clamping the overhead line between the driven wheels 16 and 17 are disposed. These clamp mechanisms 20 and 21 are composed of, as shown in FIGS. 5 and 6, a link mechanism 23 moving to and fro about the shaft 22, and clamp wheels 24 and 25 rotatably supported on this link mechanism 23. These clamp wheels 24 and 25 are pressed against the driven wheel 18 to clamp the overhead line.

The link mechanism 23 is composed of four links 26, 27, 28 and 29 forming a quadrilateral, and an engaging part 30 is disposed at the link 26 fixed on the shaft 22. The link 29 rotatably supported on the shaft 22 is abutting against the engaging part 30 by the energizing force of the spring 31, and the link 26 is defined in the clockwise rotation over a specified angle with respect to the link 29 by means of the engaging part 30. Therefore, when the shaft 22 is rotated counterclockwise by the drive mechanism 32 through a transmission mechanism such as gear, the link mechanism 23 oscillates about the shaft 22 while keeping constant the shape of the quadrilateral formed by the links 26 to 29.

The clamp mechanisms 20 and 21 are provided with a stopper 33 for defining the rotational motion range of the link 29, and when the link 29 abuts against this stopper 33, the clamp wheels 24 and 25 are pushed upward by the action of leverage as shown in FIG. 6, and abut against the driven wheel 18 through the overhead line. The link 27 is extendable in the axial direction having a spring 34 at an intermediate position, and the motion of the link after clamping the overhead line is absorbed by the spring 34, so that the clamp force is kept constant. The link 29 is integrally combined with a guide member 35, and this guide member 35 is used when guiding the overhead line beneath the driven wheel 16 or 17.

Therefore, when the drive mechanism 32 is started, the link 26 of the link mechanism 23 moves to and fro about the shaft 22. The link 29 is free to rotate about the shaft 22, and is pushed by the link 26 through spring 31, but the rotational motion range is defined at a specific angle by the engaging part 30. The angle formed by the links 26 and 29 is always constant, and the quadrilateral formed by the links 26 through 29 is kept always in a same shape. During such motion, the clamp wheels 24 and 25 move to and fro about the shaft 22. In this state, when the link 26 begins to rotate, the link 29 abuts against the stopper 33 at a specific angle, and when the link 26 further rotates, the link 29 in the stopped state overcomes the force of the spring 31, so that the link 26 is put in rotation. In this case, since the link 29 is stopped, the position of the shaft 28 is also fixed, but when the link 26 further rotates, the shaft 36 at its front end pushes the shaft 37 through the link 27. In consequence, the shaft 37 pushes down the link 28 about the shaft 38, and the opposite end of the link 28 pushes up the clamp wheels 24 and 25 by leverage.

During such operation, the clamp wheels 24 and 25 oscillate about the shaft 38. When the link 26 rotates, the clamp wheels 24 and 25 abut against the driven wheel 18 across the overhead line, and the link 28 stops moving. While the link 29 and link 28 are stopped, when the link 26 further rotates, the spring 34 of the link 27 is compressed, and the force by the portion of this compression is transmitted to the clamp wheels 24 and 25 through the link 28.

Thus, while the driven wheel 16 or 17 is placed on the overhead line, the overhead line is held by a series of actions as mentioned above. In this holding state, when the driven wheel rotates, the clamp wheels 24 and 25 roll. At this time, if the link 26 is stopped, the spring 34 compresses and absorbs the rocking motion of the link 28. On the other hand, when the link 26 is rotated reversely, the link 29 turns about the shaft 22 while abutting against the engaging part 30.

Figure 7:
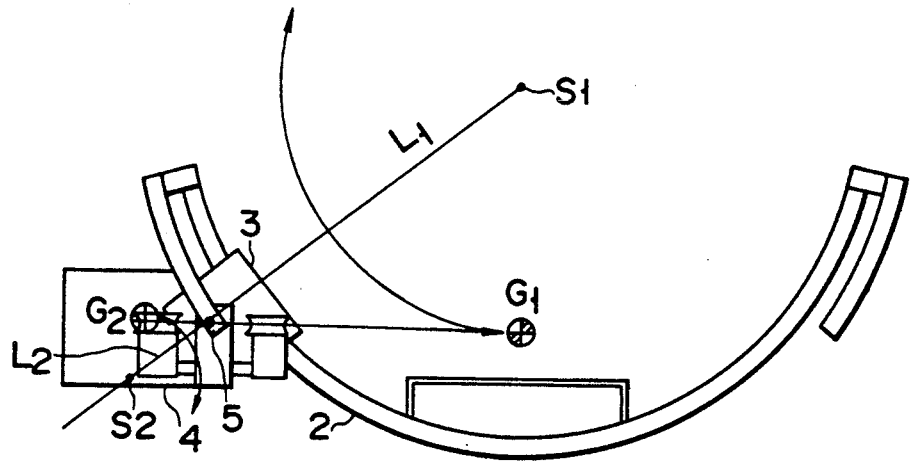
FIGS. 7 and 8 illustrate the balance relationship between the robot main body and the arm.

The balancer 4 is explained below while referring to FIG. 7.

Figure 8:
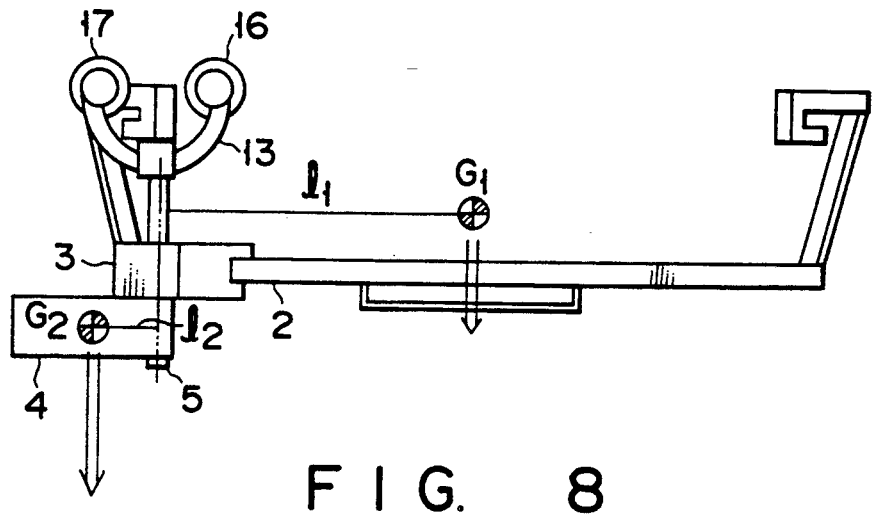

The balancer 4 is installed in order to keep balance of the carriage (robot main body) 1 when moving the arm 2 from the carriage 1, and this balancer 4 is provided with weight due to its internal control device and power source. The central axis S1 of the arm 2 is apparently in the center of the arc of the arm 2 with the unit as the system of stationary coordinates, and as the arm 2 moves, the center of gravity G1 of the arm 2 moves about this central axis S1. As the center of gravity G1 of the arm 2 moves, the balancer 4 is rocked by the drive mechanism which is not shown in the drawing, and the center of gravity G2 of the balancer 4 is moved, thereby keeping balance of the apparatus. As this center of gravity G2 moves, the imaginary rocking central axis S2 of the balancer 4 is set at a distance of L2 on the opposite side of the distance L1 against the vertical/rotational motion shaft 5 so that the relation of the center of gravity G2 of the balancer and the center of gravity G1 of the arm 1 with respect to the vertical/rotational motion shaft 5 may be $G1 \times L1 = G2 \times L2$ (L1: distance from the central axis S1 of the arm 2 to the central axis of the vertical/rotational motion shaft 5) as shown in the diagram. For example, as shown in FIG. 1, when the balancer 4 of semi-disk shape is used, the center O2 of the arm 2 becomes the imaginary rocking central axis S2. The balancer 4 is provided with a drive mechanism and driving force source, so that the relation of the center of gravity G1 of the entire arm 2 and the center of gravity G2 of the balance with respect to the vertical/rotational motion shaft 5 may be $G1 \times l1 = G2 \times l2$ (l1: distance from center of gravity G1 to vertical/rotational motion shaft 5, l2: distance from center of gravity G2 to vertical/rotational motion shaft 5) as shown in FIG. 8.

Figure 13:
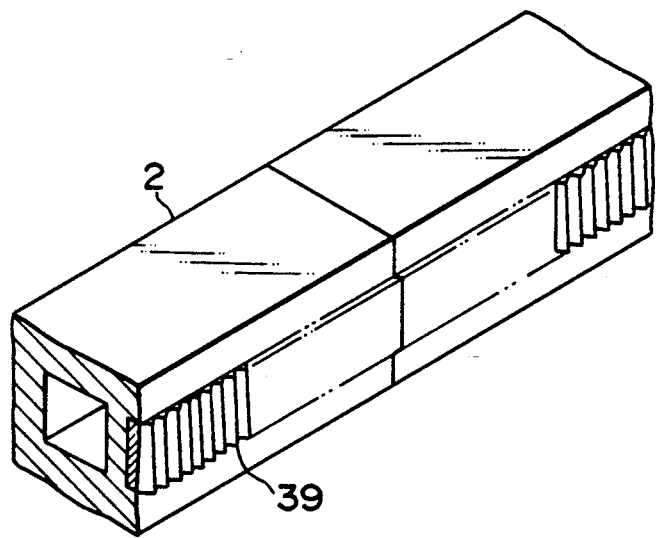

On the other hand, the arm 2 is curved in an arc shape at a specific curvature, and a rack gear 39 (see FIG. 13) is formed on the flank of the arm 2. This rack gear 39 is engaged with a driving gear 40 (see FIG. 4) provided in the unit 3, and by rotating this driving gear 40 by a drive unit such as a motor, the arm 2 moves relatively to the main body 1. The rack gear 39 is made of insulation material.

Figure 9:
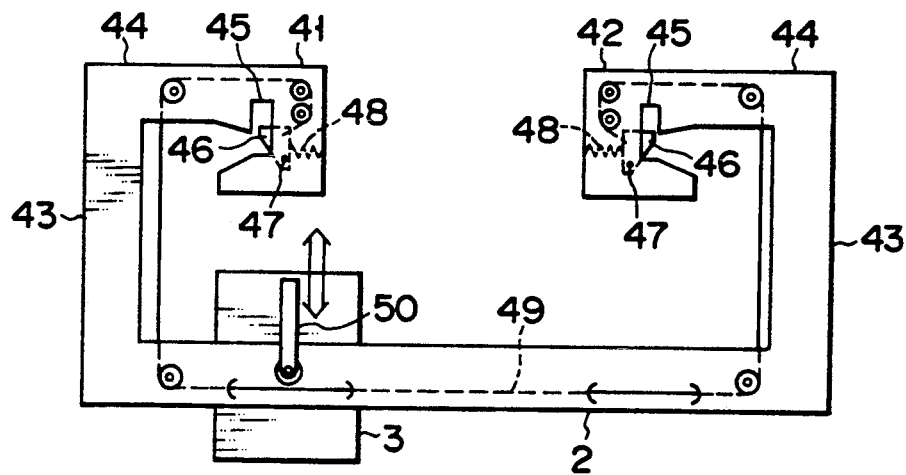
FIGS. 9 through 13 depict the constitution of the arm.

At both ends of the arm 2, hook mechanisms 41 and 42 are provided, and by applying these hook mechanisms 41 and 42 on the overhead line, the carriage 1 can move while detouring obstacles such as tower. The hook mechanisms 41 and 42 are constructed by, as shown in FIG. 9: upstanding part 43, horizontal part 44 disposed parallel to the arm 2 on the upper end of the upstanding part 43, and hook 45 attached to the front end of the horizontal part 44, and a tapered stopper 46 disposed at the inlet portion of the hook 45 rotatably about the shaft 47 so as to be easy to enter from the outside and not to slip out from the inside. This stopper 46 is energized in the direction of closing the inlet portion of the hook 45 by the spring 48, thereby preventing the overhead line from slipping off from inside of the hook 45. One end of a wire rope 49 is linked to the stopper 46, and as the wire rope 49 is towed by an operation rod 50 disposed in the carriage 1, the stopper 46 rotates about the shaft 47, thereby opening the inlet portion of the hook 45.

Figure 10:
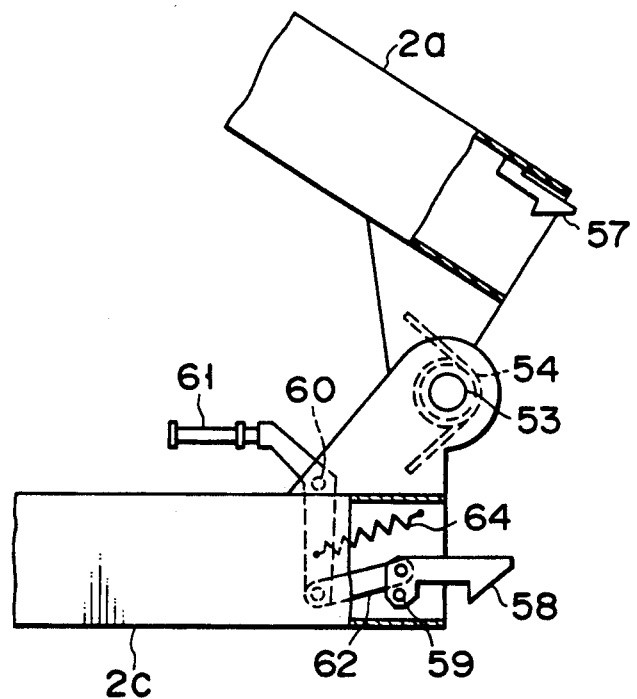
Figure 11:
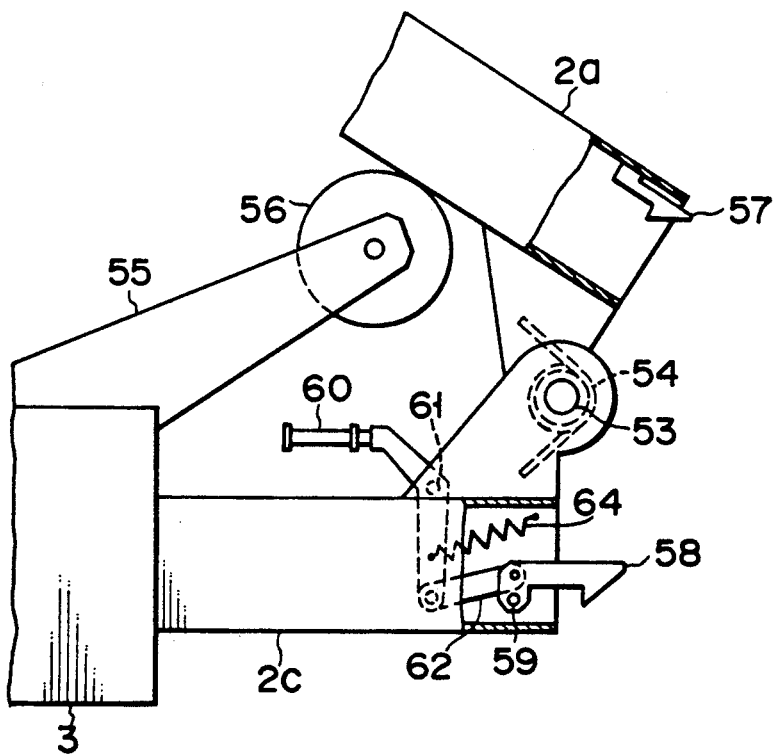

The arm 2 has joints 51 and 52. By these joints 51 and 52, both end portions can be folded inward. The joints 51 and 52 are constructed as shown in FIG. 10, and a spring 54 for energizing the arms 2a and 2b in the folded direction is disposed at a linkage shaft 53 for coupling the arms 2a and 2b at both ends (2b not shown) and the arm 2c at the carriage 1 side. Therefore, to extend the arm 2, as shown in FIG. 11, a forward roller 56 mounted on the unit 3 by means of support art 55, which abuts against the side surface of the arms 2a and 2b, and the force to overcome the spring force of the spring 54 is given to the arm 2a and 2b by this forward roller 56, so that the arms 2a and 2b are pushed out and expanded.

Figure 12:
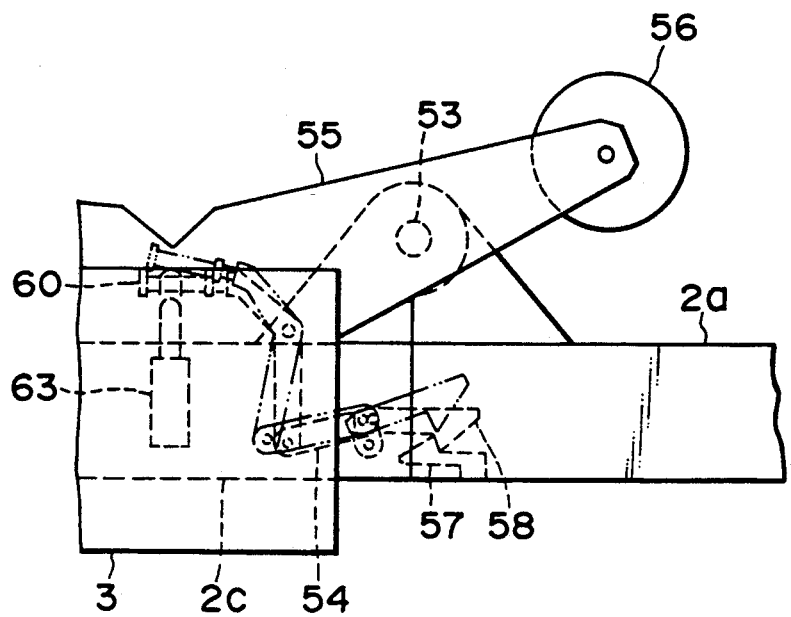

At both ends of the arm 2c, hooks 58 to be engaged with pawl 57 provided in the arms 2a and 2b are rotatably disposed about the shaft 59. The hook 58 is linked with a release lever 61 rotatably disposed about the shaft 60 through a link member 62, and when rotated in the clockwise direction in the drawing by the release member 63 disposed in the checking/monitoring unit 3 as shown in FIG. 12, the engagement of the hook 58 and pawl 57 is cleared. The release lever 61 is energized to rotate in the counterclockwise direction in the drawing by the spring 64.

The arm 2 does not require a drive unit, and hence the arm 2 is free of wire, the arm 2 is made of an insulator (KEVLAR FRP), and a detector using optical fiber is provided for the checking/monitoring unit, so that the arm 2 may be completely composed of electrical insulators. Therefore, when the carriage 1 runs on the arrester earth line stretched on a power line, the long arm 2 is safe on the power line if the power line is in an energized condition. Besides, the carriage 1 is provided with a bumper 65 for preventing this apparatus from contacting with the tower.

The action of the apparatus for tracking an overhead line is described below while referring to FIGS. 14 through 28.

As shown in FIG. 14, the mobile robot is suspended on an overhead line 70 by means of the driven wheels 16 and 17 disposed at both ends of the driven wheel holding arm 13. When moving the carriage 1 from this state, first, the overhead line 70 is clamped between the driven wheels 16 and 17 by means of clamp mechanisms 20 and 21. In this state, when the driven wheels 16 and 17 are rotated by the wheel driving mechanisms 18 and 19, the carriage 1 or the robot moves.

Figure 16:
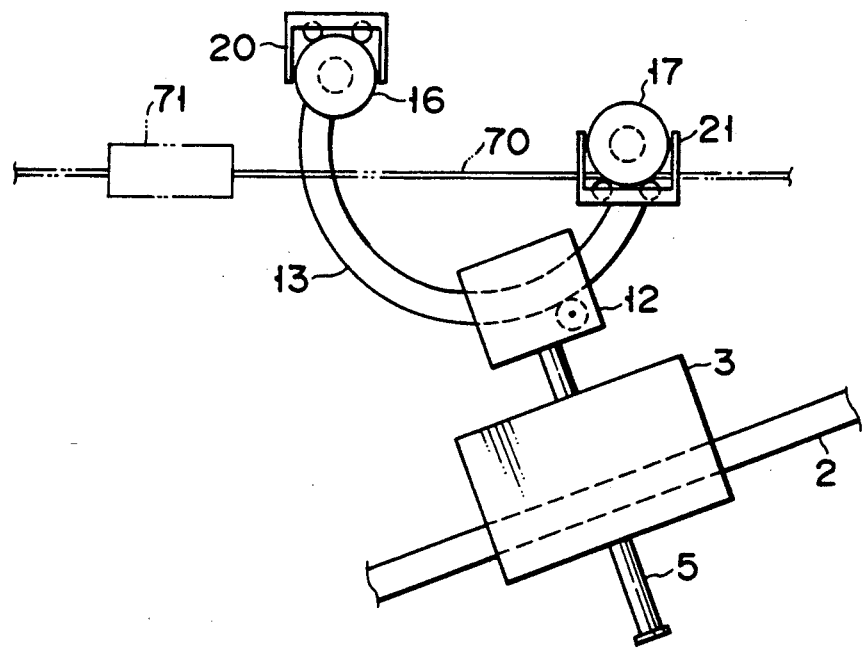

In this way, when the carriage 1 approaches an obstacle such as cable holding metal fitting or the like and the obstacle is detected by the detector, e.g. micro-switch or the like provided on the clamp mechanism 20, the carriage 1 stops just before the obstacle 71 as shown in FIG. 15. Next, by the clamp mechanism 20, the driven wheel 16 and overhead line 70 are unclamped, and the driven wheel holding arm 13 is rocked in the clockwise direction by the rocking mechanism 12. As a result, the center of gravity of the carriage 1 moves backward, and the driven wheel 16 is lifted to a position capable of riding over the obstacle 71 as shown in FIG. 16.

Figure 17:
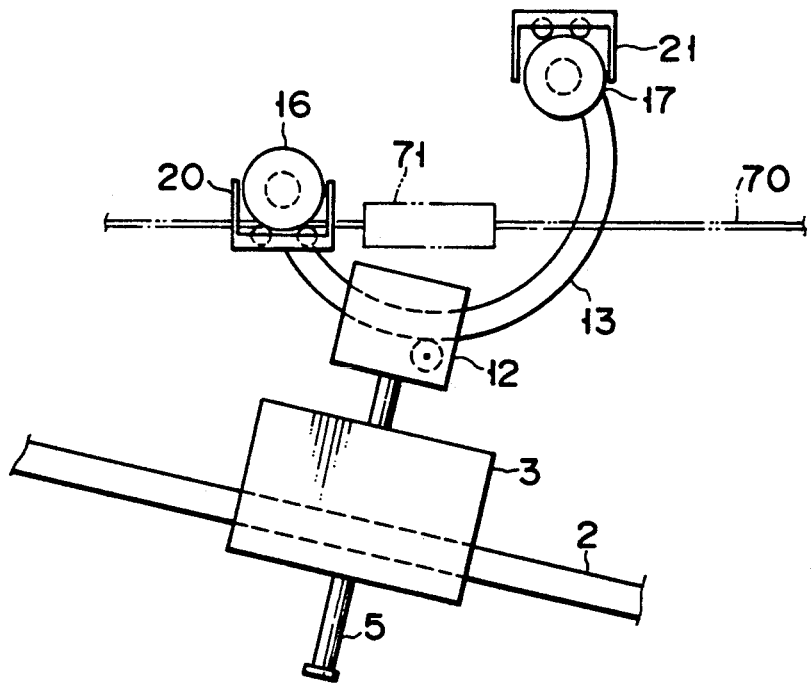
Figure 18:
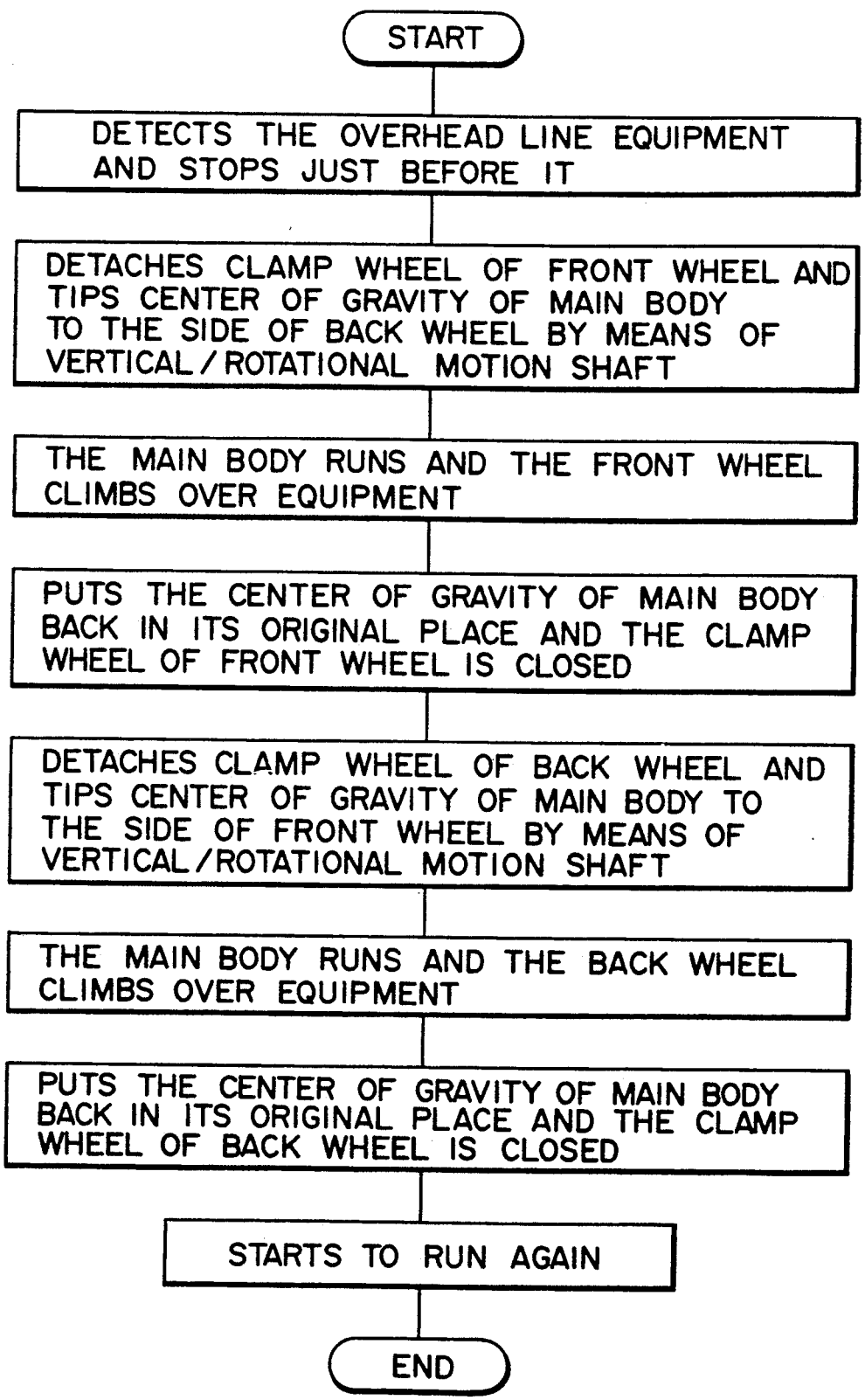
FIG. 18 shows a flowchart for explaining the operation for climbing over the obstacle.

Next, in this state, when the carriage 1 moves forward and the driven wheel 16 completely rides over the obstacle 71 and the detector mounted on the clamp mechanism 21 detects the obstacle 71, the carriage 1 stops. Afterwards, the driven wheel 16 is returned on the overhead line 70, and the driven wheel 17 and overhead line 70 are unclamped by the clamp mechanism 21, and the driven wheel holding arm 13 is rocked in the counterclockwise direction by the rocking mechanism 12. As a result, the center of gravity of the carriage 1 moves forward, and the driven wheel 17 is raised to a height capable of riding over the obstacle 71 as shown in FIG. 17. Therefore, as the carriage 1 moves forward in this state during a predetermined time interval, the carriage 1 can ride over the obstacle 71 such as the cable holding metal fitting or the like mounted on the overhead line 70. This series of operation is shown in the flowchart in FIG. 18.

Figure 19:
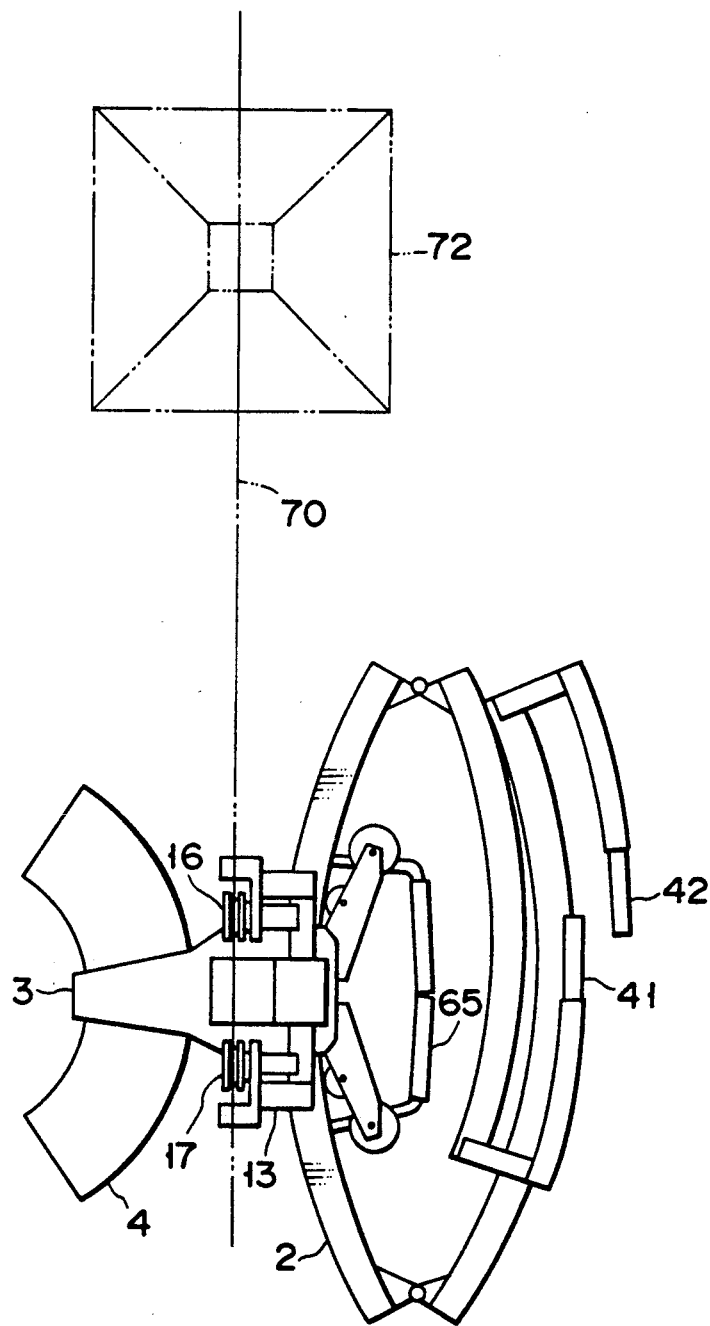
Figure 20:
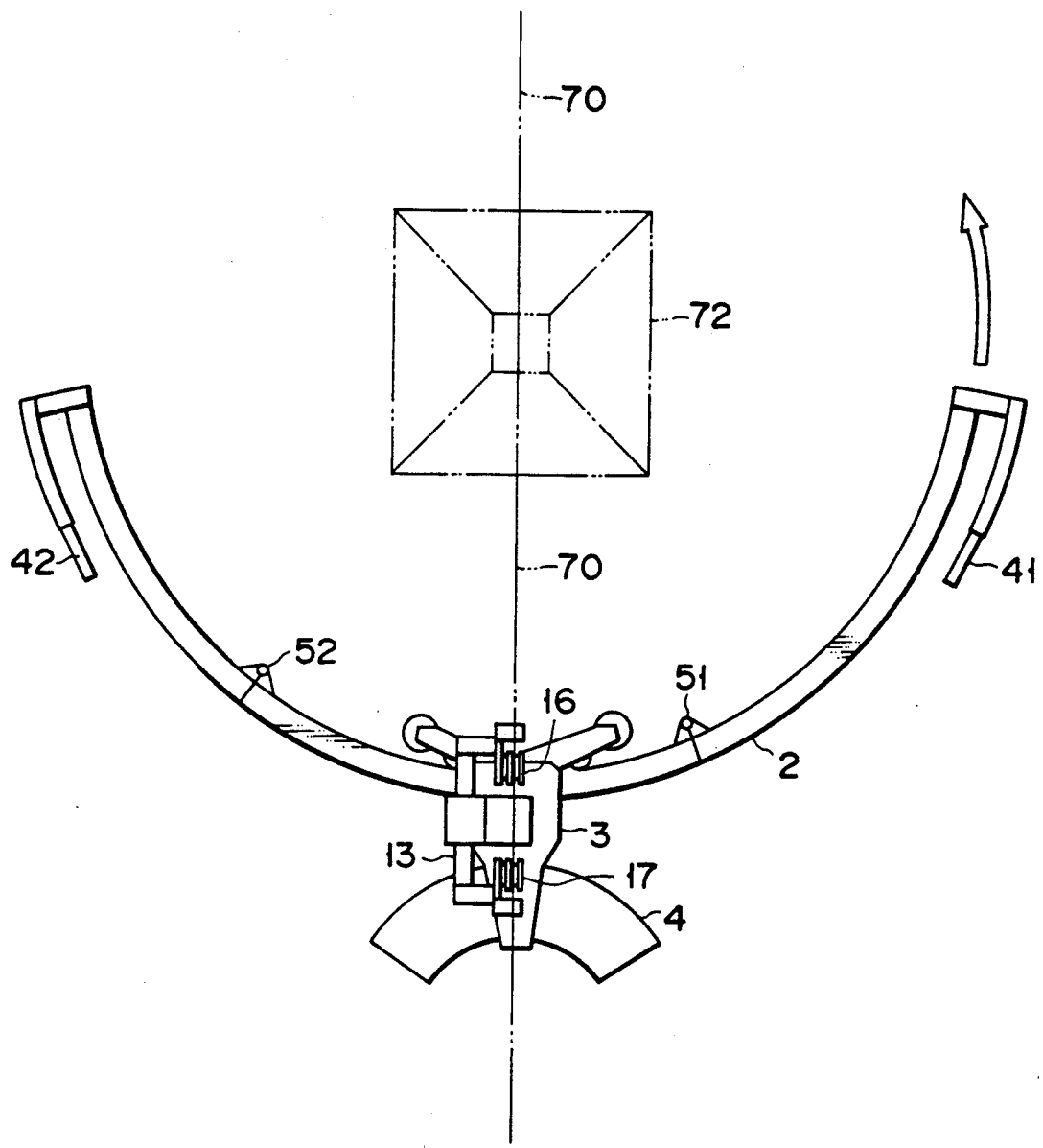
Figure 23A:
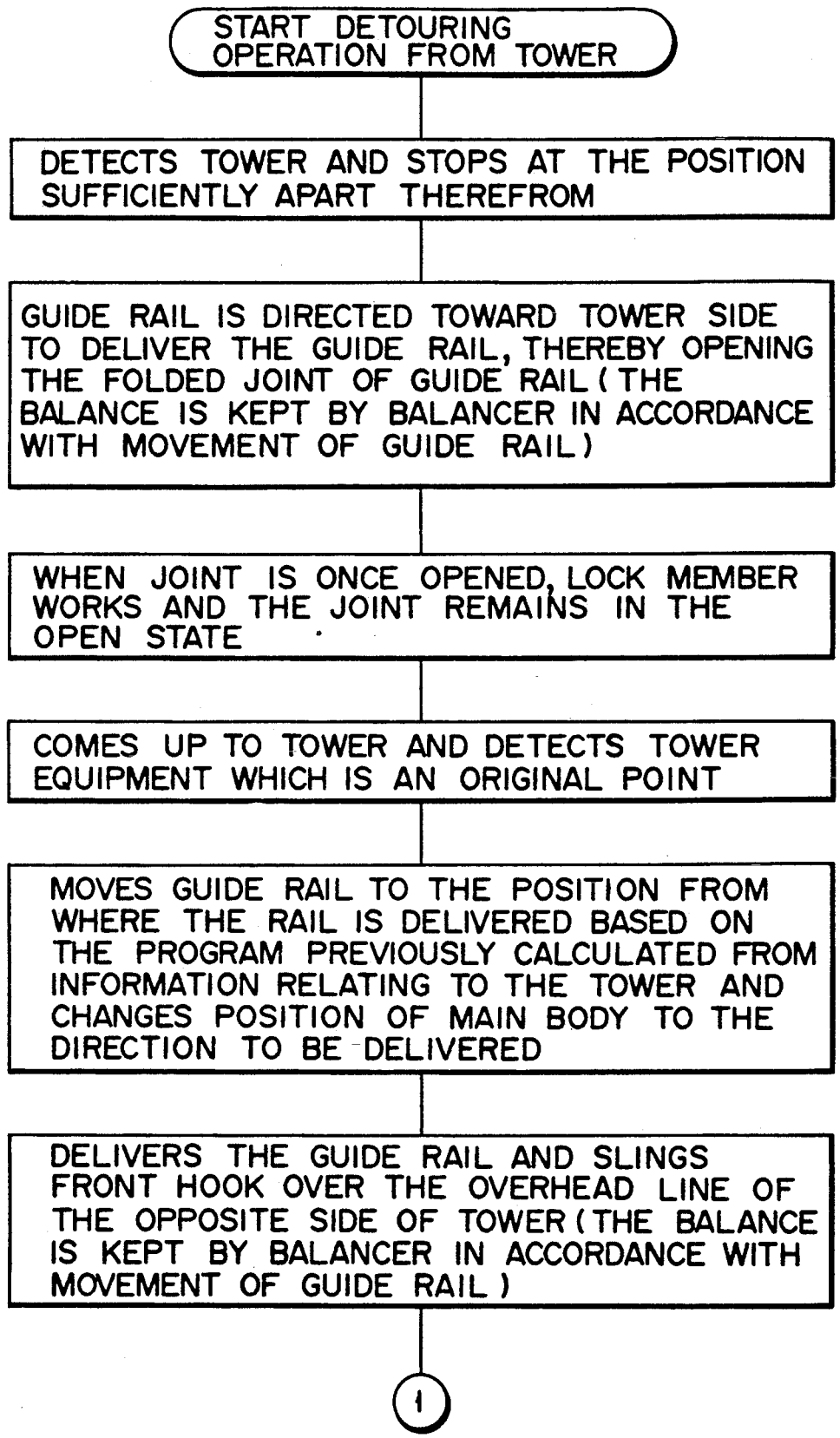
Figure 23B:
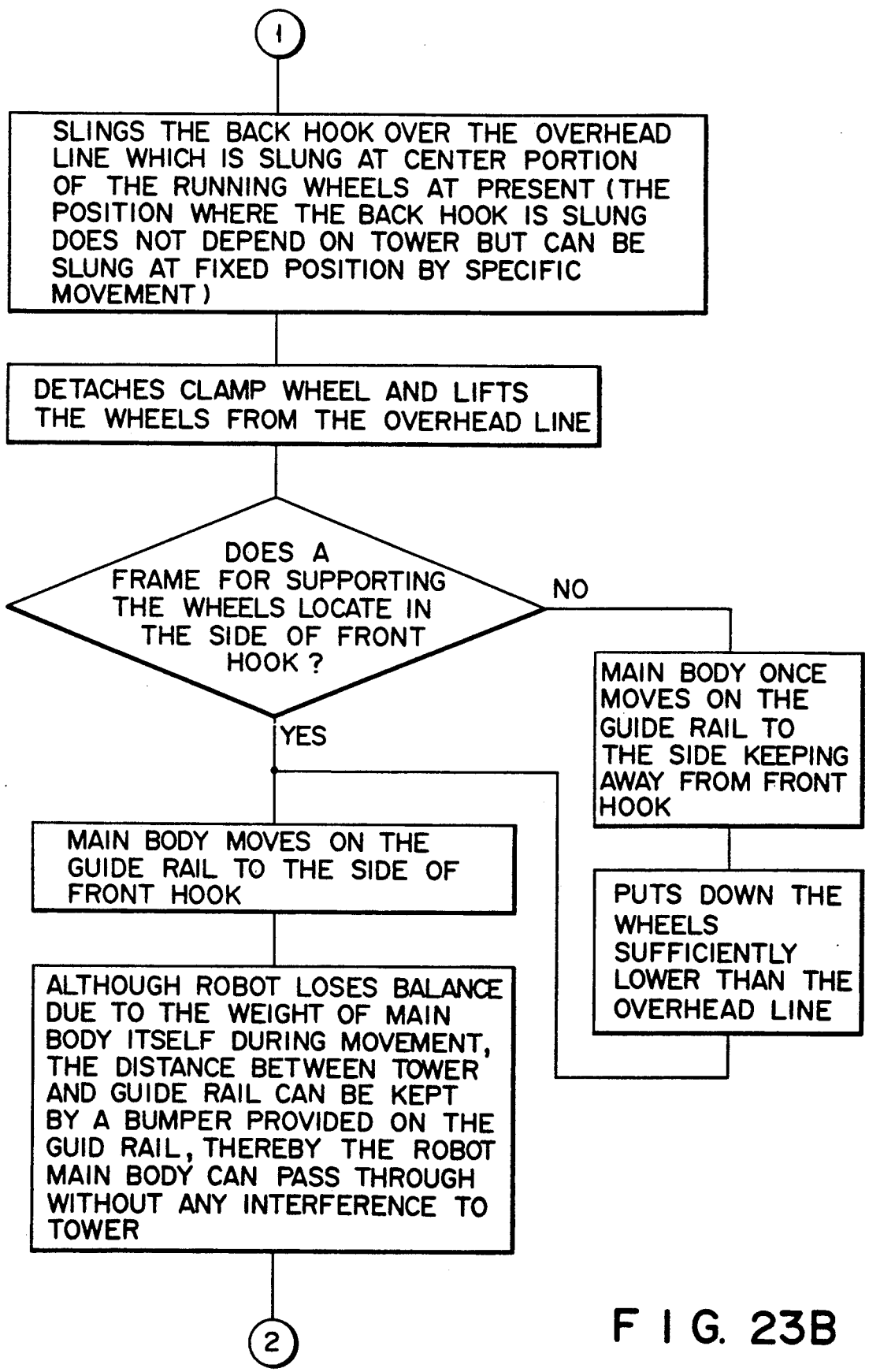

When the robot approaches a tower while moving and a distance measuring device provided on the carriage 1 measures a predetermined distance from the tower 72, the robot stops at the distance from the tower 72 as shown in FIG. 19. Then, if the information presenting the direction in which the support post of the tower 72 supports the overhead line 70 is prestored in the controller, the vertical/rotational motion shaft 5 of the carriage 1 is rotated in such a direction that the arm 2 rotates without contacting the support post, in accordance with the information. For example, as shown in FIG. 19, when the overhead line 70 is supported from beneath, the vertical/rotational motion shaft 5 is rotated by a quarter revolution in either right or left direction, so that the arm 2 confronts the tower 72. Next, as shown in FIG. 20, both ends 2a and 2b of the arm 2 are extended, and the robot approaches the tower 72 in this state. When the robot moves up to a specified distance from the tower 72, the robot stops in response to the distance signal output from the distance measuring device. At this time, the arm 2 is moved relative to the carriage 1. When the hook mechanism 41 at one side of the arm 2 reaches the opposite side of the tower 72, that is, the opposite side of the position of the carriage 1, the arm 2 is rocked vertically by the rocking mechanism 12 as the carriage 1 is suspended on the overhead line 70. Consequently, the hook mechanism 41 at the front end of the arm 2 is moved longitudinally or vertically, and is applied on the overhead line 70 on the opposite side across the tower 72.

FIG. 21 shows the state of application of the hook mechanism 41 on the overhead line 70. In this state, the hook mechanism 41 is first sent out beneath the overhead line 70, in accordance with the information of the overhead line, and is then raised. This elevation of the hook mechanism 41 continues until hitting of the arm 2 against the overhead line 70 is detected (contact detection of arm 2 upper side, limit detection of driving force of rocking mechanism 12, etc.). In turn, the hook mechanism 41 is pulled back until hitting of the inside of the upstanding part 43 against the overhead line 70 is detected (contact detection of upstanding part inside, limit detection of driving force of rotating mechanism, etc.). Furthermore, the hook mechanism 41 continues to descend until hitting of the horizontal part 44 against the overhead line 70 is detected (contact detection of horizontal part 44, limit of rocking mechanism, etc.). Finally detection of driving force of the arm 2 is continuously sent out until the hook mechanism 41 is hooked on the overhead line 70. The detecting actions are performed by a micro-switch or detection of the overcurrent of motor or servo-error.

In this way, when it is detected by a sensor mechanism described later that the hook mechanism 41 is hooked on the overhead line 70 on the opposite side across the tower 72, the hook mechanism 42 is positioned on the vertical/rotational motion shaft 5 by the sendout movement of the the arm 2. Since the upper part of the carriage 1 is suspended on the overhead line by the rocking mechanism 12, as the vertical/rotational motion shaft 5 is moved vertically, the carriage 1 also moves vertically together with the arm 2. Hence, the hook mechanism 42 moves longitudinally and vertically, and is applied on the overhead line 70 of the nearer side of the tower 72 at the position held by the driven wheels 16 and 17 (see FIGS. 21 and 22).

Afterwards, with the hook mechanisms 41 and 42 being applied on the overhead line 70, the driven wheels 16 and 17 and overhead line 70 are unclamped by the clamp mechanisms 20 and 21. In this case, as shown in FIG. 22, if the driven wheel holding arm 13 has already surpassed the overhead line 70 in the direction of extension of the arm 2 and is positioned in the running direction of the carriage 1, the carriage directly moves on the arm 2. To the contrary, when the driven wheel holding arm 13 is positioned at a point not surpassing the overhead line 70 in the extension direction of the arm 2, the carriage 1 moves on the arm 2 first in a direction opposite to the running direction, and the driven wheels 16 and 17 are lowered beneath the overhead line 70 by the vertical/rotational motion shaft 5, and is positioned at the running direction side of the carriage 1.

When the carriage 1 moves on the arm 2, incidentally, the horizontal balance of the carriage 1 may be greatly broken on the axis of the imaginary line linking the hook mechanisms 41 and 42, but when the carriage 1 comes to the hook mechanism 41 side, the carriage position returns. However, at the intermediate point of breaking the balance, the arm 2 may collide against the support post of the tower 72 or the like. In this apparatus, since the arm 2 is provided with bumpers 65 at other positions than the traveling route surface of the carriage 1, the bumper 65 touches the support post or the like in the first place as shown in FIG. 22, and a bumper projection distance is kept between the arm 2 and the support post, so that collision is avoided.

Next, when the carriage 1 reaches the opposite side of the tower 72, the driven wheel holding arm 13 is directed to a desired side to the overhead line 70 by the vertical/rotational motion shaft 5, and two driven wheels 16 and 17 are lifted at the same time. At this time, if the driven wheel holding arm 13 interferes with the overhead line 70 and cannot approach in that state, the driven wheels 16 and 17 are first lowered below the overhead line 70 and then lifted up. In this state, the carriage 1 moves just beneath the hook mechanism 41 applied on the overhead line 70. Afterwards, the guide member 35 is projected downward near the driven wheels 16 and 17, and the two guide members 35 are both abutted against the overhead line 70 until positioned (the state shown in FIG. 5). When this abuts at two positions, the direction of the vertical/rotational motion shaft 5 is aligned. In the aligned direction, the arrangement direction of the driven wheels 16 and 17 coincides with the direction of the overhead line 70. In this state, by vertical motion of the vertical/rotational motion shaft 5, the driven wheels 16 and 17 are mounted on the overhead line 70. That is, the carriage 1 is hooked on the overhead line.

After riding of the driven wheels 16 and 17 on the overhead line 70 is confirmed, the wire rope 49 is operated, and the inlet portion of the hook 44 is opened, and the hook mechanisms 41 and 42 are dismounted from the overhead line 70. Afterwards, the arm 2 is pulled back, and the arm 2 is rotated in a desired direction to the running direction by the vertical/rotational motion shaft 5, and the series of detouring action is over.

In this tower detouring action, even if the overhead line is bent in any direction vertically or laterally with respect to the running direction from the boundary of the support post, the operation is basically the same except for the extension direction of the arm 2 (the swivel angle and inclination). This series of operations is shown in the flowchart in FIG. 23.

Next is explained the operation of mounting the apparatus for tracking an overhead line of the invention on the overhead line from above the ground.

Figure 24:
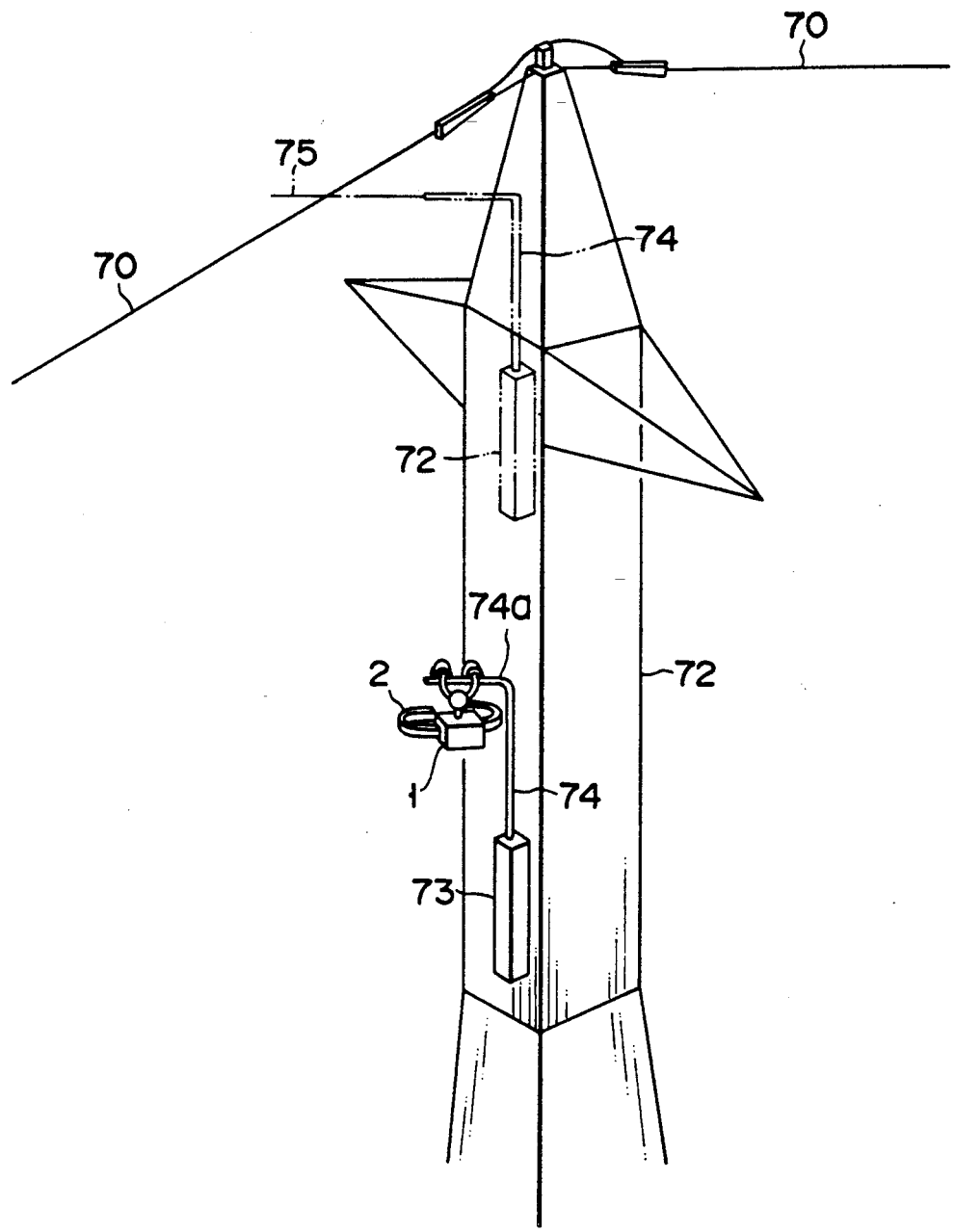
FIGS. 24 through 28 represent the state when the robot is suspended on an overhead line from above the ground.
Figure 25:
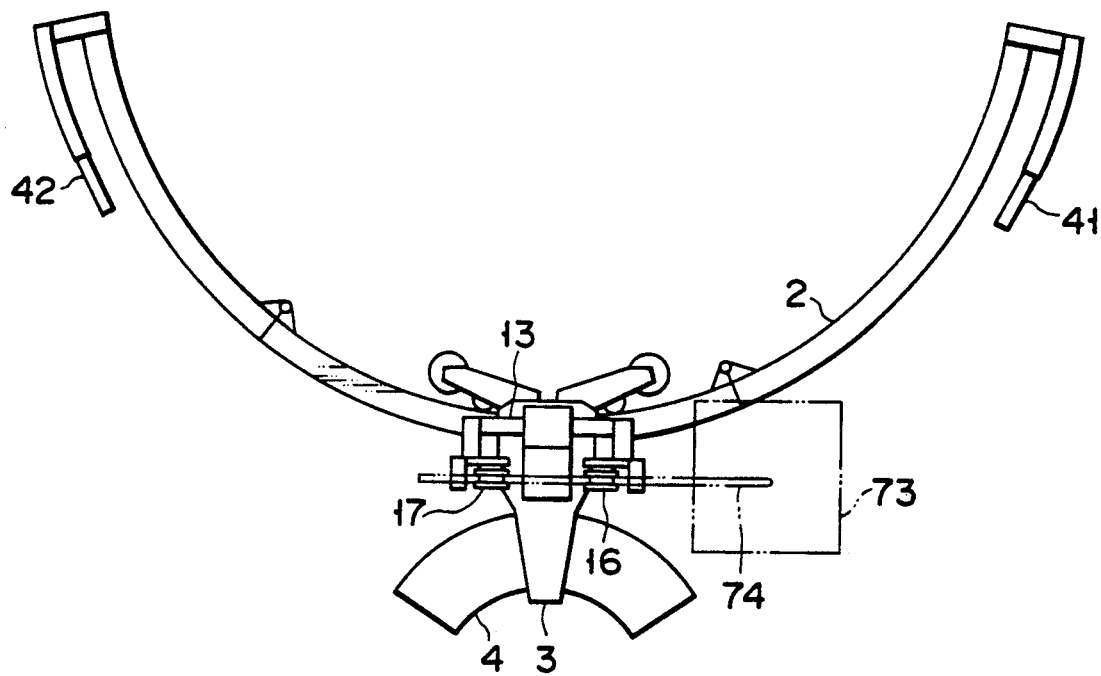

First, as shown in FIG. 24, a perch member 74 nearly the same thickness as the overhead line 70 is provided in an elevating device 73 for moving up and down the tower 72, and the carriage 1 is suspended on the horizontal portion 74a of the perch member 74. In this state, the elevating device 73 is raised, and the elevating device 73 is stopped when the extension 75 of the perch member 74 come to the position horizontally crossing the overhead line 70. Afterwards, as shown in FIG. 25, the arm 2 is extended, and this arm 2 is sent out, and one of the hook mechanisms 41 and 42 is hooked on the overhead line 70, and the other one of the hook mechanisms 41 and 42 is hooked on the perch member 74. Meanwhile, the perch member 74 is disposed rotatably on the elevating device 73, and its intersecting angle with the overhead line 70 may be freely adjusted.

Figure 26:
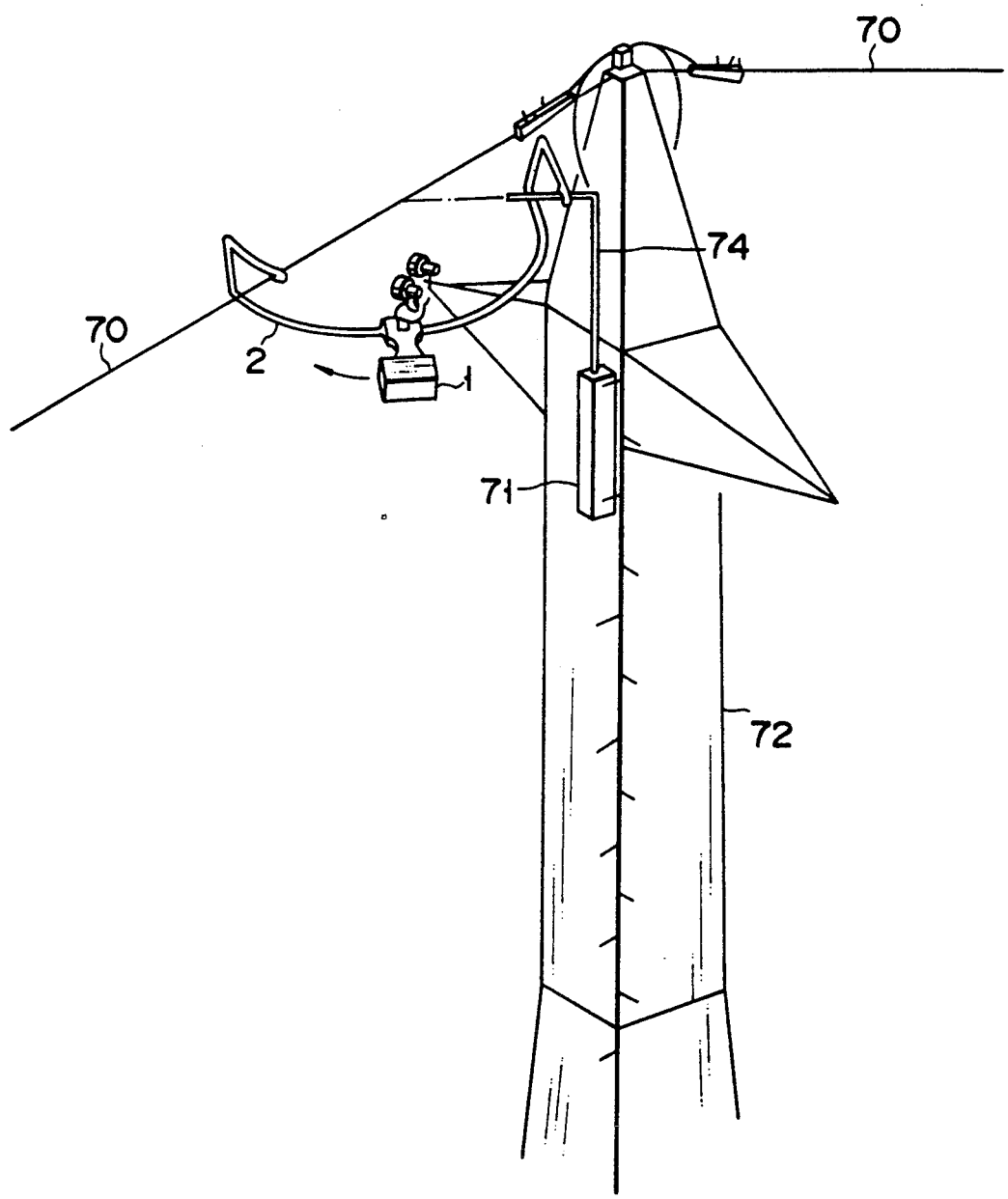

Then, after the clamp between the wheels 16 and 17 and the perch member 74 is released by means of clamp assemblies 20 and 21, the carriage 1 moves relative to the arm 2. Thereby, the carriage 1 moves to the side of overhead line 70 from the perch member 74 as shown in FIG. 26.

As mentioned above, if the carriage 1 moves to the side of overhead line 70, the wheels 16 and 17 are mounted on the overhead line 70, and the overhead line 70 is clamped between the wheels 16 and 17 by means of the clamp assembly 20 and 21. After that, the hook assemblies 41 and 42 are detached from the perch member 74 and the overhead line 70, and the carriage 1 changes transfer to the overhead line 70 from the perch member 74.

Figure 27:
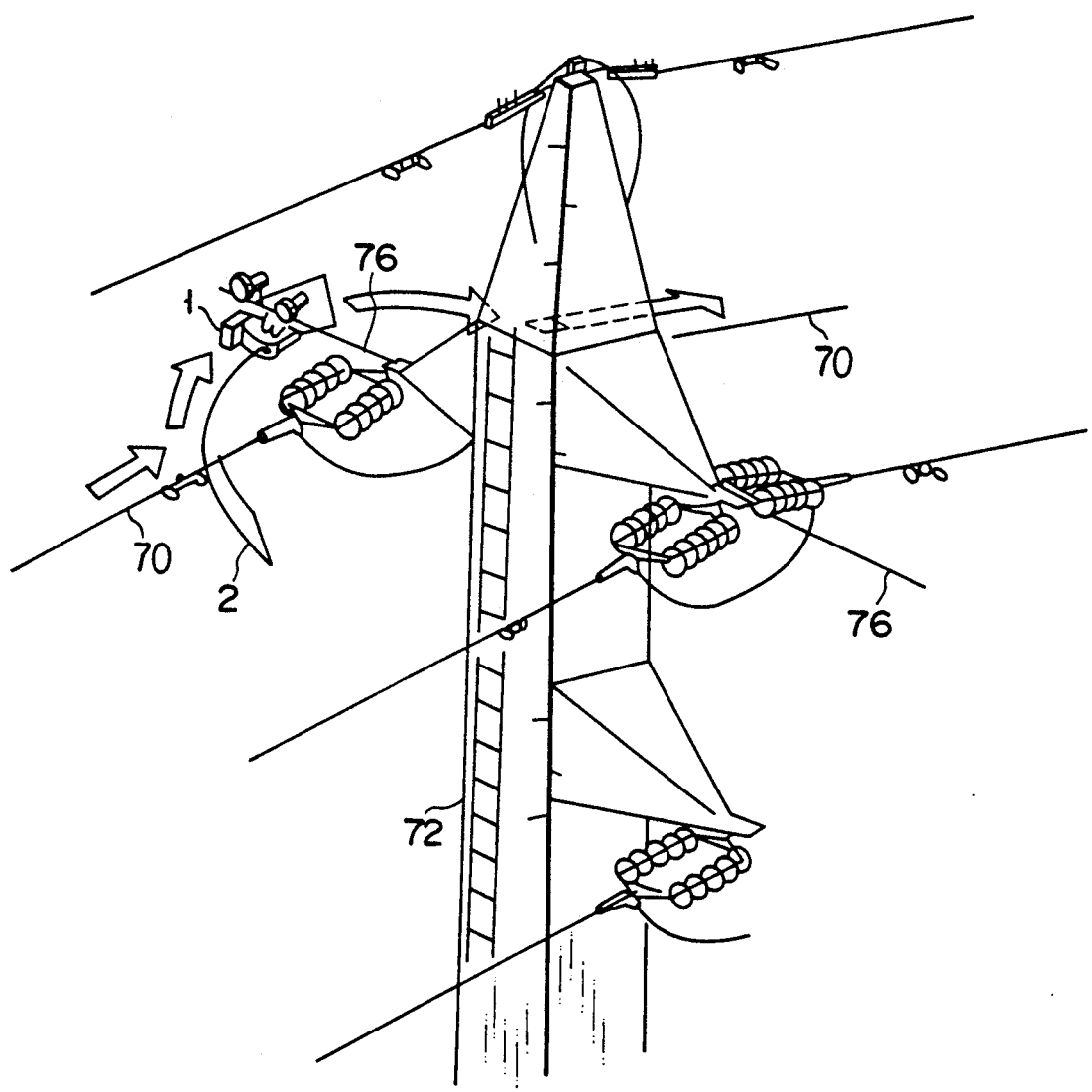
Figure 28:
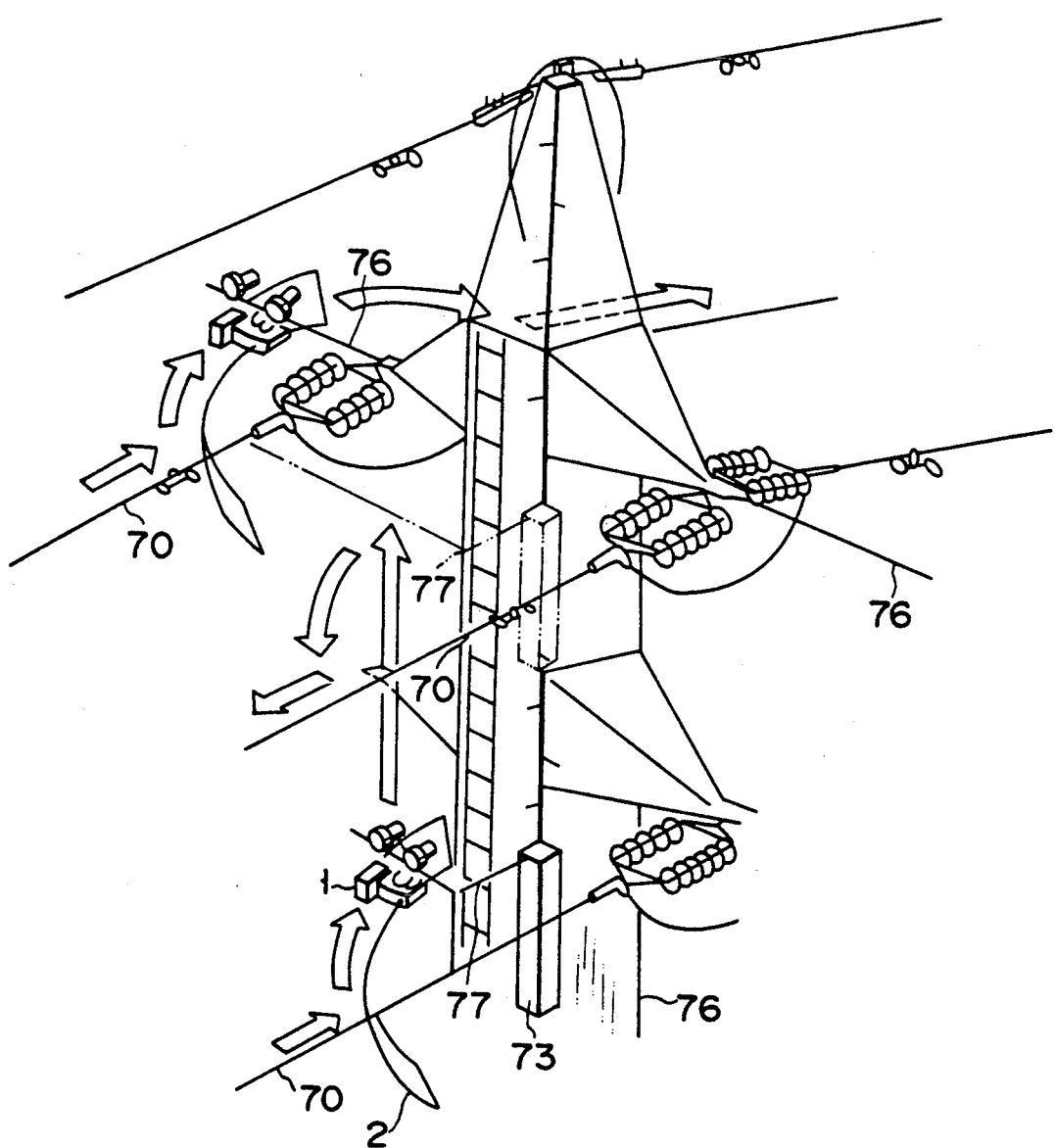

In case of where an arm 2 can not reach the overhead line 70 located on an opposite side with a tower 72 between, if a perch member 76 having same thickness as that of the overhead line 70 is provided on the tower 72 as shown in FIG. 27, the arm 2 can detour the tower 72 by utilizing such perch member 76. The perch member 74 provided on the tower 72 is not restricted to the type as shown in FIG. 24, but a perch member 77 which is attached to elevator 73 horizontally can be used. In case of changing transfer from an overhead line slung to another overhead line, for example, to an upper or lower overhead line or to a next overhead line having the same height it is possible to use the perch members 74 and 77 provided on the elevator as a relay position at the time of changing transfer thereto. Further, the elevator is not also restricted to the type as mentioned above, and an apparatus in which a block is attached to the tower or overhead line can be used to raise the perch member by means of a winch by using wire.

Reference is made to an explanation as to a detecting mechanism, that is, a sensor mechanism.

Figure 29:
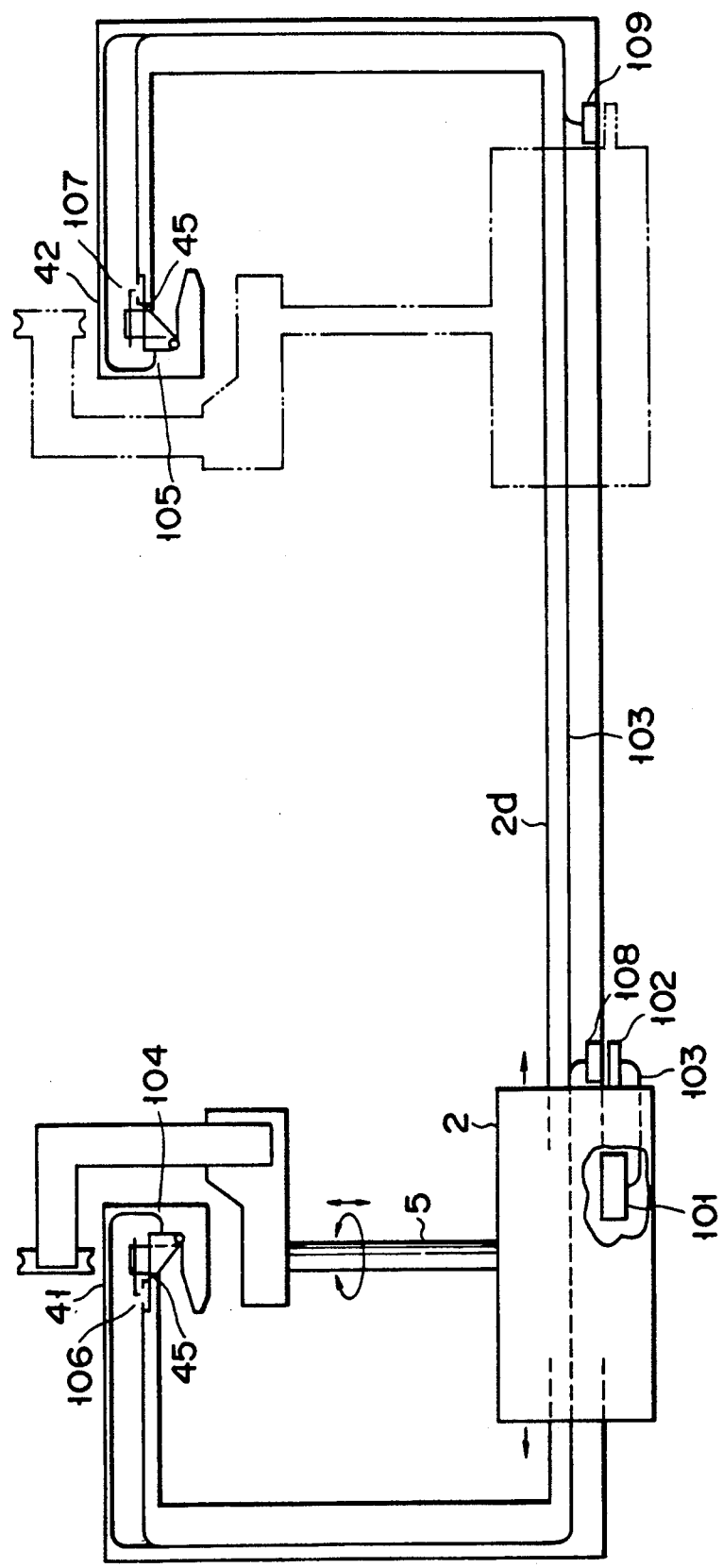
FIG. 29 illustrates the robot main body and the arm mechanism.

As shown in FIG. 29, a sensor amplifier 101 and a repeater 102 are provided on a checking/monitoring unit 3, and the sensor amplifier 101 is connected with the repeater 102 with the relation of 1:1 by means of an optical fiber 103. Detectors 104, 105, 106, and 107 for detecting supplemental arm information are provided on the hook assembly 41 and 42. Two supplemental arm repeaters 108 and 109 are provided on a supplemental arm 2d. The detectors 104 to 107 are connected with the supplemental arm repeaters 108 and 109 with the relation of 1:2 by means of the optical fiber 103. When the carriage 1 is located in the position marked with the straight line in FIG. 29 and the center of a hook 45 is on an extension line of center of a vertical/rotational motion shaft 5, the repeater 102 is located opposite to the supplemental repeater 108. On the other hand, when the carriage 1 is located in the position marked with the two dots line and the center of hook 45 is on the extension line of center of the vertical/rotational motion shaft 5, the repeater 102 is located opposite to the supplemental repeater 109.

The detector 104 (105) which is provided in the innerside of the hook assembly 41 (42), is a detector of claw switching for detecting whether a claw 46 at entrance of hook 45 is open or closed, and the detector 106 (107) is an overhead line detector for detecting whether an overhead line 70 is inserted into the hook 45 or not.

Figure 30:
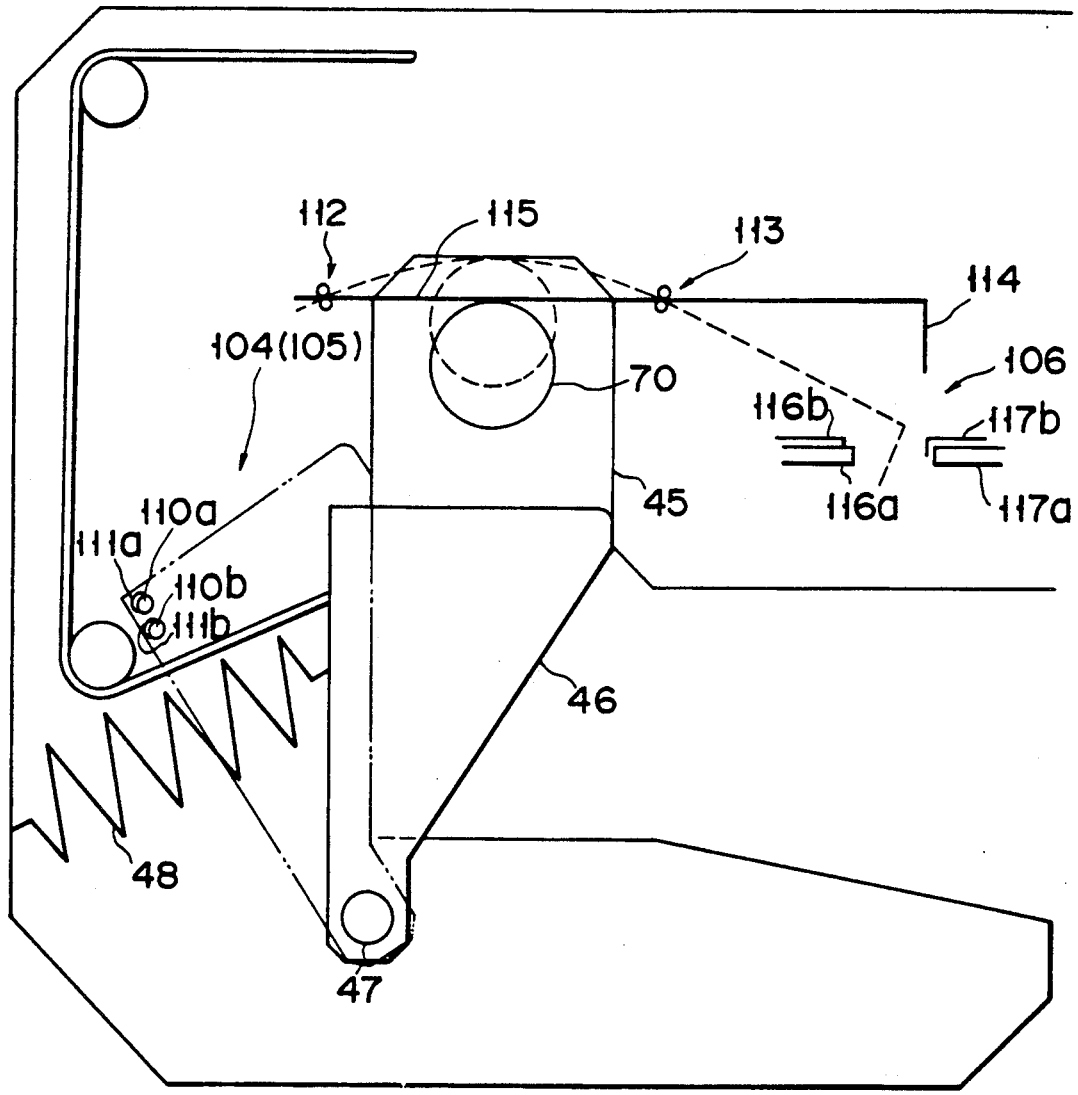
FIG. 30 shows a hook mechanism and a sensor mechanism.

The detector of claw switching 104 (105) comprises light-projecting heads 110a and 110b and light-receiving heads 111a and 111b provided oppositely, and the claw 45 can move between the heads 110a and 110b on the one hand, and the heads 111a and 111b, on the other. When the claw 46 opens the entrance of hook 45, the claw 46 shields between the light projecting heads 110a and 110b and the light receiving heads 111a and 111b as shown in FIG. 30 marked with the two dots line, thereby detecting claw switching.

The overhead line detector 106 (107) comprises light projecting heads 116a and 116b, light receiving heads 117a and 117b, and a shutter 114 attached to one of the elastic joints 115 supported in the back of hook 45 by supporting members 112 and 113. According to this detector, when the overhead line 70 is pressed to the back of the hook 45 the overhead line 70 moves to the position as shown by the dot line, thereby deflecting the joint 115 as shown by the dot line. Thereby, the shutter 114 shields between light projecting head 116 and light receiving head 117 as shown by the dot line, and the detector 106 (107) detects whether the overhead line 70 is inserted into hook 45 or not.

Figure 31:
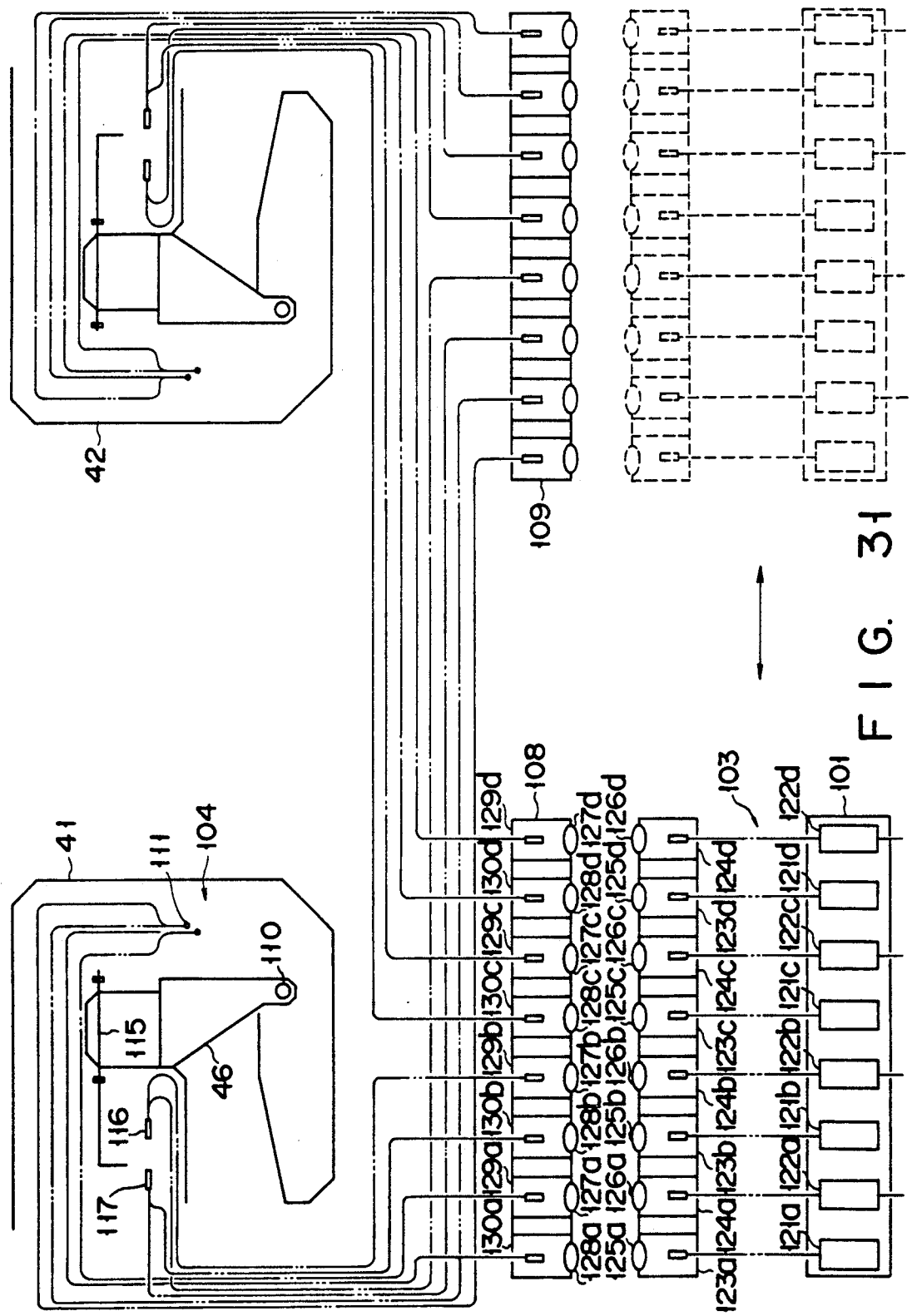
FIG. 31 is a detailed view of a sensor unit.

Reference is made to an explanation of movement of sensor amplifier 101, repeater 102, supplemental arm repeaters 108 and 109, and detectors 104 to 107 based on FIG. 31.

The sensor amplifier 101 contains light emitting elements 121a to 121d and light receiving elements 112a to 122d. The repeater 102 contains light projecting members 123a to 123d and light receiving members 124a to 124d. The connecting relation between light projecting members 123a to 123d and light emitting elements 121a to 121d of sensor amplifier 101 and between light receiving members 124a to 124d and light receiving element 122a to 122d is 1:1, respectively. As to the light projecting members 123a to 123d and light receiving members 124a to 124d, lenses 125a to 125d and 126a to 126d are provided in the front surface of the edge surface of the optical fiber 103. The lenses 125a to 125 collimate the light emitting from the edge surface of the optical fiber 103 and the lenses 126a to 126d converge the collimated light which is the incident light to light receiving members 124a to 124d, into the edge surface of the optical fiber 103.

Each supplemental arm repeater 108 and 109 comprises light projecting members 129a to 129d and light receiving members 130a to 130d having lenses 127a to 127d and 128a to 128d, respectively. The connecting relation between the light projecting members 129a to 129d and the light receiving heads 111a and 111b of the detectors 104 to 107 and between the light receiving members 124a to 124d and the light projecting heads 110a and 110b of the detectors 104 to 107 by means of the optical fiber 103 is 1:1.

Reference is made to the movement of the above sensor.

When or after the carriage 1 detours the tower 72 by hooking the arm 2 over the overhead line 70, or before or after the arm 2 is detached from the overhead line 70, the carriage 1 moves to the position as shown by straight line in FIG. 29 or the position where the center of hook 45 of the hook assembly 41 (42) is on the extension line of the center of vertical/rotational motion shaft 5 as shown by the two dots line. If the carriage 1 is in the position shown by the straight line in FIG. 29, since the light projecting members 123a to 123d of the repeater 102 are located opposite to the light receiving members 130a to 130d of the arm repeater 108 and the light receiving members 124a to 124d of the repeater 102 are located opposite to the light projecting members 129a to 129d of the arm repeater 108, it is possible to achieve emitting and receiving of light. Accordingly, if a light generates from the light emitting elements 121a to 121d, such light passes through the optical fiber 103 and is guided into the light projecting members 123a to 123d of the repeater 102 as a parallel light, and then such parallel light is guided into the light receiving members 130a to 130d converge the guided parallel light into the optical fiber 103 and the converged light passes through the optical fiber 103 and enters into the light projecting heads 110a and 110b of the detectors 104 to 107.

In the situation as above, when the claw 46 is closed, the incident light from the light projecting head 110a reaches the light receiving head 111a and further passes through the optical fiber 103 to reach the light receiving member 124a of the arm repeater 108. Accordingly, the light is collimated by the lens 126a and is converged into the optical fiber 103. The converged light passes through the optical fiber 103 and enters into the light receiving element 122a, and the resulting light is converted into an electric signal by means of the light receiving element 122a. This electric signal is inputted into the checking/monitoring unit 3, thereby detecting the closed state of claw 46 of the hook assembly 41 by means of a control device.

When the claw is open, since the claw 46 shields between the light projecting head 11a and the light receiving head 111a, the light can not reach the light receiving element 122a. Accordingly, since the light receiving element 122a does not produce any electric signal, the checking/monitoring unit 3 identifies the open state of claw 46.

After the overhead line 70 is hooked on the hook assembly 41 and 42, it is pressed in the back of the hook 45 of the hook assembly 41 and 42 by means of vertical/rotational motion mechanisms (8 to 11) as shown in FIG. 30 marked with the dot line. As a result of that, the light projecting heads 116a and 116b and the light receiving heads 117a and 117b react accordingly, and since the light receiving heads 117a and 117b do not produce any electric signal, the checking/monitoring unit 3 identifies that the overhead line 70 is inserted into the hook 45.

According to the sensor comprising light receiving head and the light projecting head and so on as mentioned above, it is possible to detect the engagement state of the overhead line 70 and the carriage 1, thereby controlling movement and stop of carriage 1.

Reference is made to an explanation as to a joint mechanism which is used for the arm 2 in detail.

Figure 32:
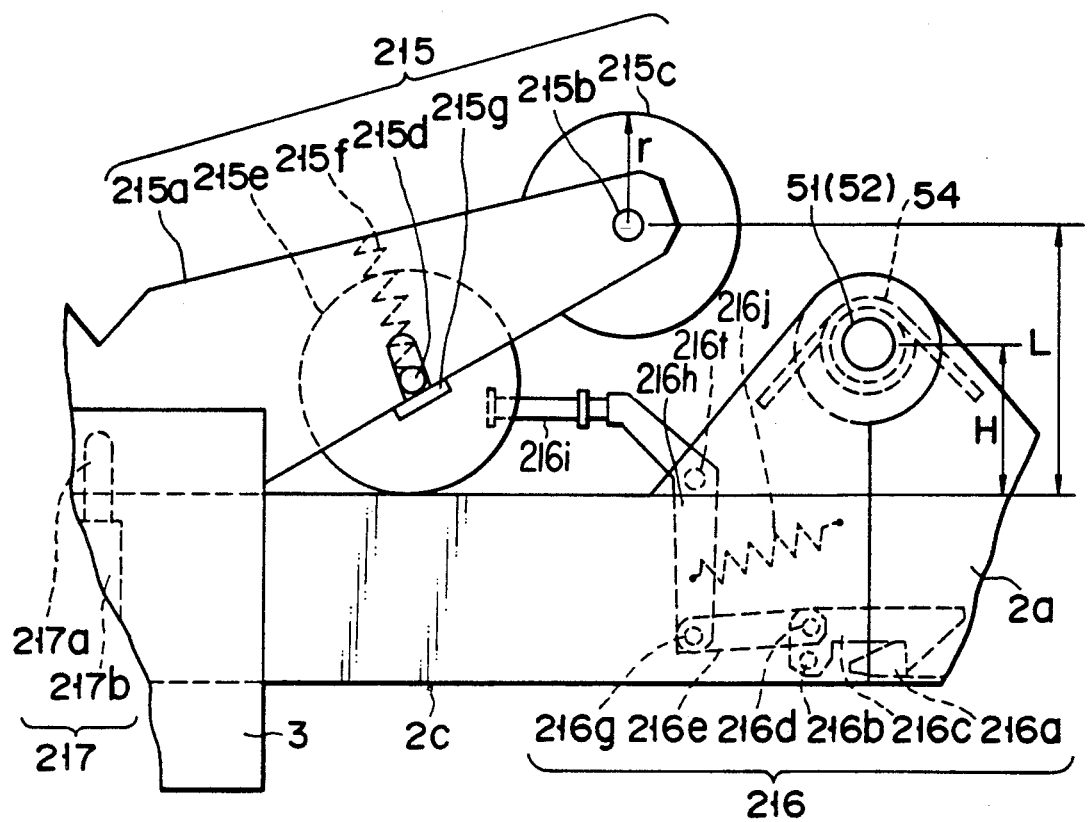
FIG. 32 is a plan view of a joint mechanism.
Figure 33:
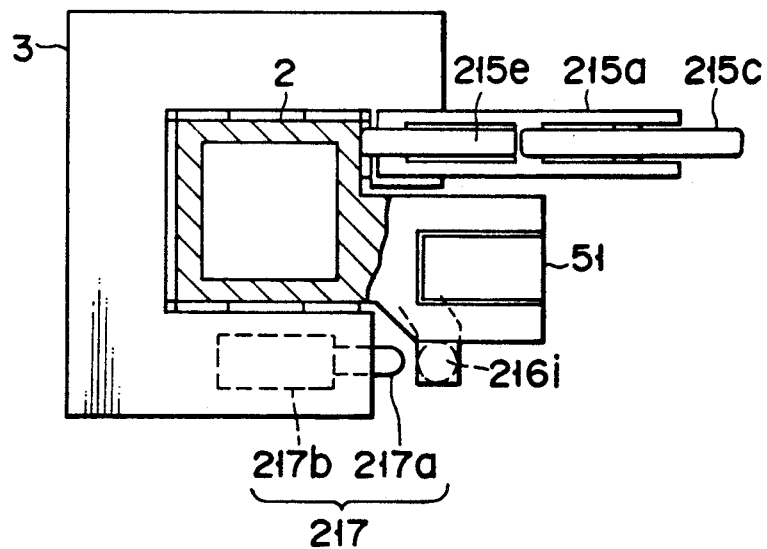
FIG. 33 is a side view of a joint mechanism.

As shown in FIGS. 32 and 33, an arm 2c in the primary side and an arm 2a in the secondary side are supported rotatably by means of a joint 51 (52) at the position apart from the arm surface for H distance. A spring member 54 having force for bending between the arms 2a and 2c is attached to the joint 51. On the other hand, on the carriage 1 which is moving on the arm 2, a stretching assembly 215 for stretching the bent joint 51 is provided. This stretching assembly 215 is formed as follows.

A frame 215a fixed on the carriage 1 supports a supplementary wheel 215c rotatably by means of a shaft 215b at the position apart from the arm surface for L (>H) distance, which is farther than that in the bending side and the position preceded or the carriage 1, and supports a wheel 215e rotatably by means of a shaft 215d at the position adjacent to the arm 2c and the position between the supplementary wheel 215c and the carriage 1. In this case, the frame 215a presses the precedence wheel 215e on the side of arm 2 by the spring 215f. Further, a stopper 215g is provided to prevent the wheel 215e from spring out more than it needs due to the force of the spring 215f.

A lock member 216 for fixing the state when the bent arm is stretched is provided on the joint 51. This lock member 216 comprises as follows.

When the arm is stretched, one portion of a block 216a attached to the arm 2c in the secondary side engages with the arm 2c in the primary side. A claw 216c rotatably supported to the arm 2c by means of a shaft 216b has the shape of hooking on the block 216a. A link 216h rotatably supported to the arm 2c by means of a shaft 216f is connected to the claw 216c by means of shafts 216d and 216g of both ends of a link 216e.

One portion of the link 216h projects to outside and a lock release lever 216i is attached to such projection. In the state of where the claw 216c is hooked on the lock 216a, a spring 216j applies the force on the link 216h to the direction where the claw is not detached.

A releasing mechanism 217 for releasing fixed state by reacting with the lock release lever 216i of the lock member 216 is provided on the carriage 1. The release member 217 has a pusher 217b (for example, a ball spring or solenoide) fixed on the carriage 1 to push out or pull in the pusher 217a.

Further, the supporting member and running member as mentioned in the above embodiment are provided in the side of carriage 1.

The movement of the indirect member as shown in FIG. 32 is explained as follows based on FIGS. 34 and 35.

Figure 34:
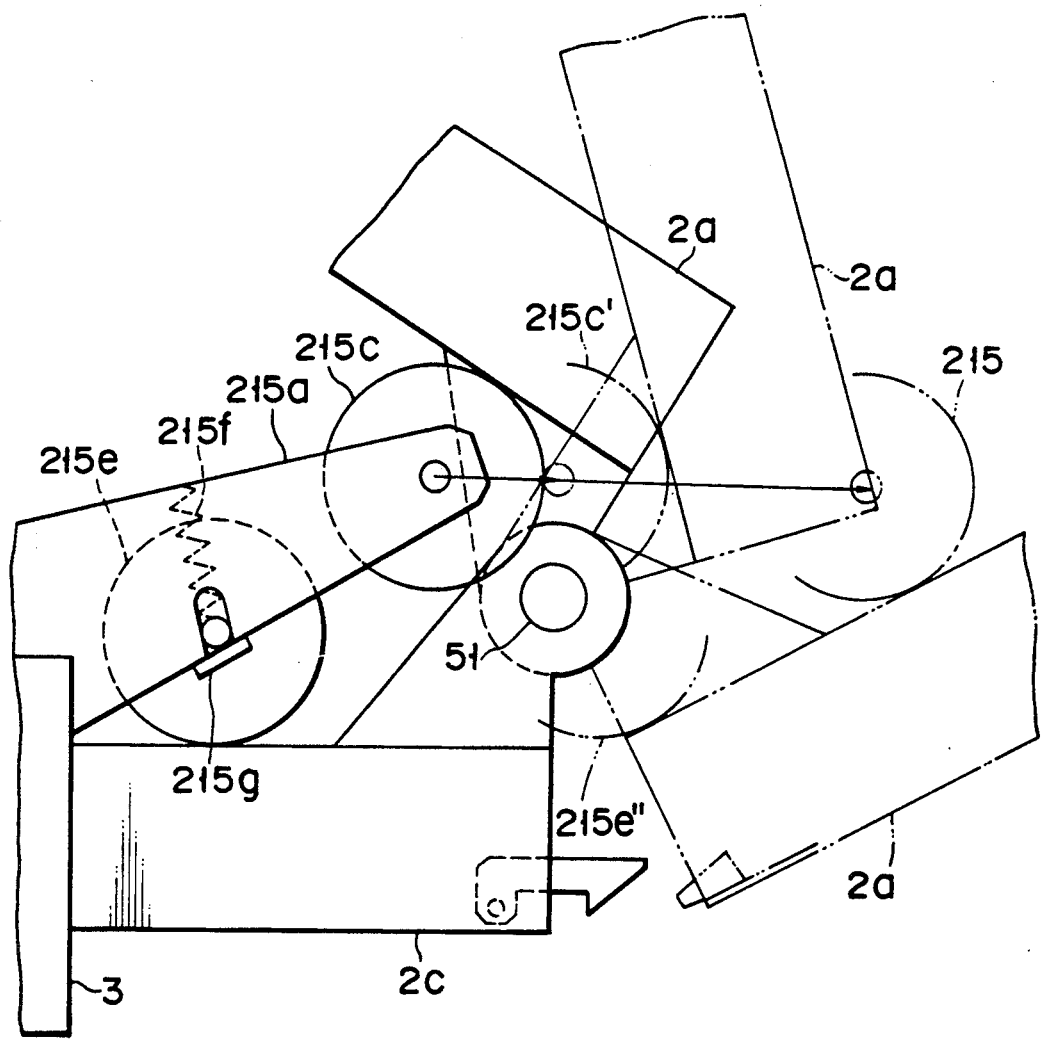
FIGS. 34 and 35 are drawings for explaining the operation of the joint mechanism.

In FIG. 34, the joint 51 bends between the arms 2c and 2a by means of a normal spring member 213. In these circumstances, the supplementary wheel 215c of the stretching assembly contacts with the arm 2a in the secondary side just before the carriage 1 passes (as shown by straight line). If the carriage 1 goes forward on the arm 2, the supplementary wheel 215c pushes its way through the urging force of the spring member 213, thereby pushing and opening the arm 2a of the joint 51 (as shown by one dot line). If the carriage 1 goes forward further, the wheel 215e which is pressed on the arm 2c by the spring 215f is supported by the stopper 215g to prevent it from dropping in the gap which is made before the arm 2c in the primary side is connected with the arm 2a in the secondary side completely, and the wheel 215e changes transfer from the arm 2c in the primary side to the arm 2a in the secondary side (as shown by the two dots line).

Figure 35:
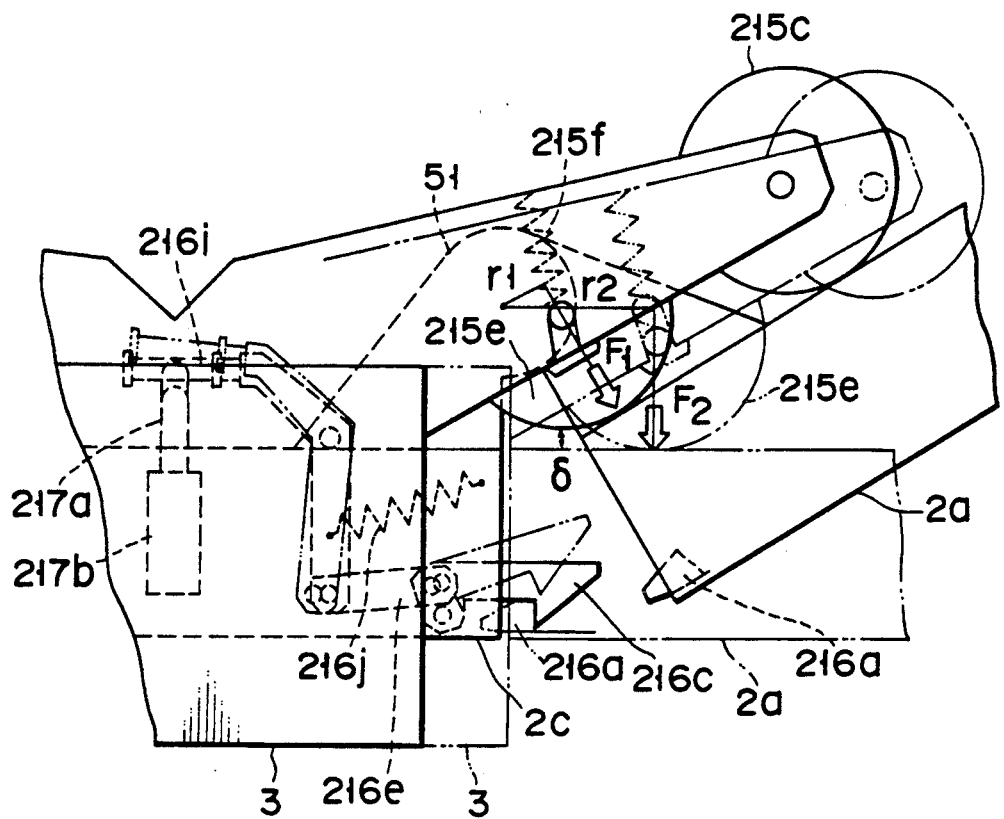

Nextly, as shown in FIG. 35, if the wheel 215e changes transfer to the arm 2a in the secondary side, the wheel 2a is pushed up by a distance δ geometrically. However, such force pushed up is sucked by the contraction of the spring 215f. Even though the force F1 of the contacted spring 215f is made to be large, a torque for stretching the joint 51 is small because an effective radius rI against the joint 51 is very small (as shown by straight line). Further, if the carriage 1 goes forward along the arm 2c, the effective radius rI against the wheel 215e becomes large, thereby generating the torque which is more powerful than the spring member 213 of the joint 51. As a result, the joint 51 is stretched and the arms 2a and 2c are arranged in series (as shown by two dots line). At this time, the block 216a of the lock member 216 once opens the taper of the claw 216c on which the force of the spring 216j is applied and engages with the arm 2c in the primary side. Thus, the claw 216c is engaged with the block 216a by the force of spring 216j.

The carriage 1 moves on the arms 2a and 2c which are arranged in series in these circumstances, thereby achieving predetermined working.

In order to bend the stretched joint 51, the carriage 1 stops at the position where the torque for stretching joint 51 by the stretching assembly 215 does not occur in FIG. 35 (as shown by straight line), and the pusher 217a of the pusher member 217b in the release member 217 (corresponds to the member 63 in FIG. 12) is pushed out. As a result, the urging force of a spring 216j of the lock member 216 transmits through the link 216e, while stretching the spring 216j of the link 216h, to detach the claw 216c from the block 216a (as shown by two dots line). At this time, as to the wheel 215e, the spring 215f is pushed up by the torque of the spring 213 in the joint 51, and the arm 2a and 2c bend until the supplementary wheel 215c supports the arm 2a in the secondary side.

If the carriage 1 is made to be kept away from the joint 51 in FIG. 34, since the supplementary wheel 215c supports the arm 2a in the secondary side which is bent by spring 213, it is possible to bend the arms 2a and 2c at any speed by selecting the speed of the carriage 1 on the arm 2.

In order to detach the carriage 1 from the arm 2, if the carriage 1 runs on the arm 2c while detaching the stretching assembly 215 from the carriage 1, it is possible to detach the carriage 1 at the position of joint 51. Since the joint 51 is offset from the arm 2, at the joint 51 bending largely, the track arm 2a in the secondary side keeps away from the portion on the extension line of the arm 2c in the primary side for a distance relating to the offset and bending angle. If the stretching assembly 215 is only detached from the carriage 1, since the arm 2a in the secondary side does not move as it is, the carriage 1 can be detached therefrom without regard to the arm 2a in the secondary side.

For example, in case of where the wheel 215e is single wheel, the radius 2L of the wheel becomes inevitably large because the joint can be stretched only when the distance L (in case of single wheel, radius of the precedence wheel) from arm surface to center of wheel 215e is larger than the offset H from arm surface to the joint center. However, according to the embodiment of the present invention, while holding the small radius of the wheel 215e, the supplementary wheel 215c having small radius r (r<L) is separately and previous provided at the position where a shaft center is apart from the arm surface for offset L (L>H), thereby obtaining enough movement for stretching joint of the offset H by such precedence supplementary wheel 215c. An interference width at the time of running the arm 2 is L+r, and this value is smaller than the value of interference area of the stretching assembly 215 narrow, thereby the carriage 1 can pass through narrower width.

Since the wheel 215e and the supplementary wheel 215c are supported by the bearing and so on, there is a small amount of friction and it is possible to make loss against the driving force at the time of running the carriage 1 on the arm 2 minimum.

Since the precedence wheel 215e always contains the elastic force against the track by means of the spring 215f and the stopper 215g to prevent it from dropping into a slit due to such elastic force, in case of having slit in the arm 2, more than it needs, the wheel 215e can change transfer smoothly from the arm 2c in the primary side to the arm 2a in the secondary side without dropping into the gap at the time of stretching the joint 51.

The spring 215f of the stretching assembly 215 has not only force for stretching the joint 51 but also has a force for sucking the geometric unreasonableness generated when the wheel 215e changes transfer to the arm 2a in the secondary side, thereby improving a life and reliability of the stretching assembly 215 further.

Since the joint 51 can be folded by supporting the arm 2a in the secondary side by means of the supplementary wheel 215c, it is possible to prevent the joint 51 from folding suddenly by the spring force of 213. Namely, it is possible to obtain the movement without any vibration and with high controllability not only in stretching the joint 51 but also in folding the same.

As to the protection of the carriage 1, the carriage 1 can be detached from the arm 2 at the position of the bent joint 51 by detaching the precedence member. Accordingly, it is needless to provide any member for protecting carriage 1, such like a development of supporting member of carriage 1 or parting of the arm 2.

Figure 36:
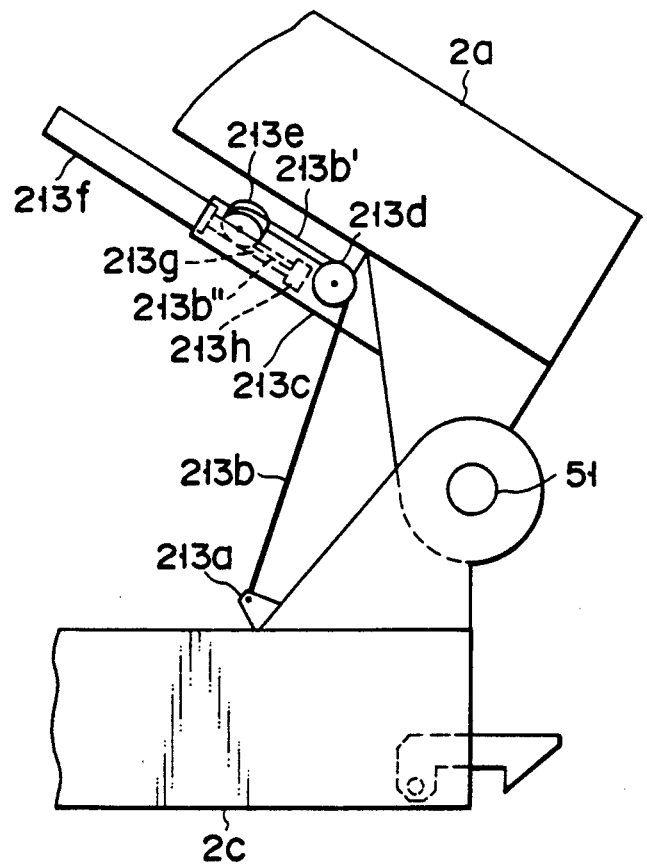
FIG. 36 is a diagram showing a modified example of the joint mechanism.

An example as to a transformed indirect member is explained based on FIG. 36.

In this example of the transformed indirect member, only the spring 213 is different from the above indirect member and is constructed as follows.

A wire 213b rotatably supported by a pin 213a to one of the arm 2a or 2c (for example, arm 2c in the primary side) is stretched at the height where the wire can wind round the joint 51. The wire 213b is guided into the innerside of the spring frame 213c by blocks 213d and 213e which are rotatably supported to the spring from 213c attached to another of the arms 2a and 2c (for example, the arm 2a in the secondary side) and is attached to a piston 213h at the tip portion of a shaft 213g of a gas spring 213f.

According to the above structure, the shaft 213g of the gas spring 213f is pushed out with the approximately fixed force at every position within stroke of the shaft 213g. The piston 213h at the tip portion of the shaft 213g produces the force for pulling the wire 213b'' into the spring frame 213c. Such force of piston 213h is reversed by the block 213e and is transmitted by the wire 213b to pull in the wire 213b which is extended from the direction turning to the right on the horizontal surface by means of the block 213d. Namely, the piston 213h works as a tension isobaric spring having approximately fixed force.

The function according to the above structure will be explained as follows based on FIG. 37.

Figure 37:
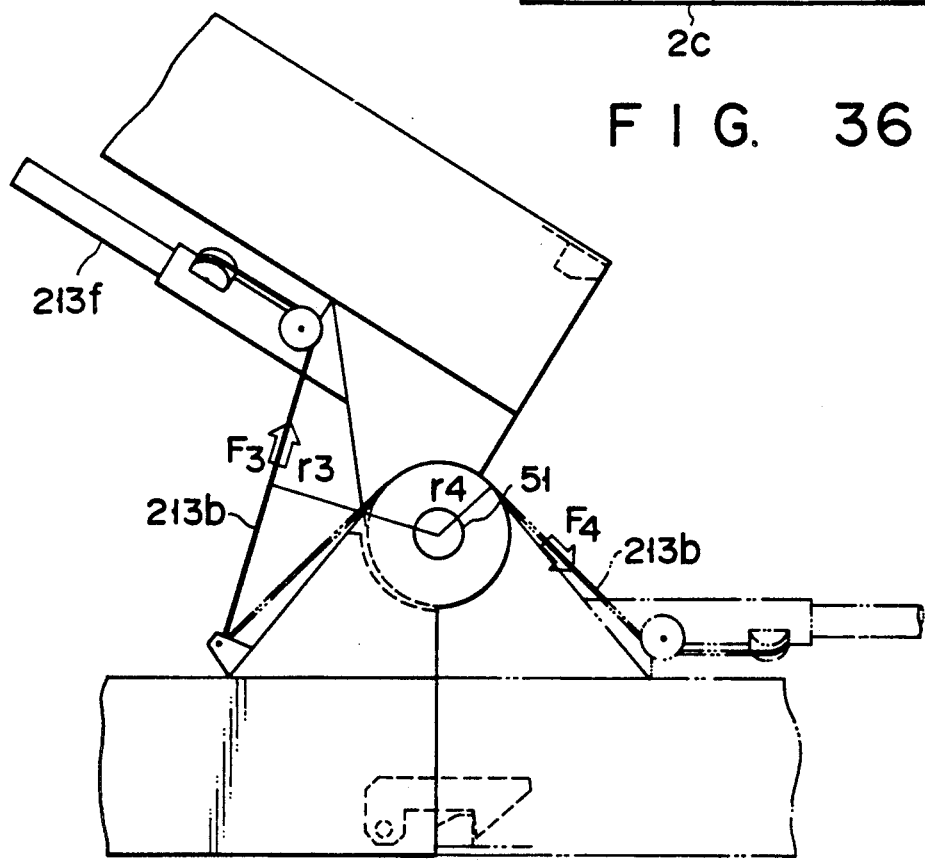
FIG. 37 is a diagram to show the operation of the indirect mechanism in FIG. 36.

FIG. 37 shows the working of wire 213b in the states of when the joint 51 is bent (as shown by straight line) and the joint 51 is stretched (as shown by two dots line). In case of where the joint 51 is bent, there is a considerable distance r3 between the wire 213b and the center of joint 51. On the other hand, in case of where the joint 51 is stretched, the wire 213b winds round the joint 51 and there is only distance r4 which is same as outer diameter (radius) of joint 51 between the wire 213b and the center of joint 51. Since the spring utilizing the gas spring 213f has approximately fixed force without regard to stroke, such spring stretches the wire with same force (F3=F4) in both cases of where the joint 51 is bent and stretched. Accordingly, the torque for bending the joint 51 becomes large in the case of bending, F4·r4 than the case of stretching, F3·r3.

Thus, in case of where the joint 51 is bent, since the torque for maintaining the bending state, the bending state of joint 51 is not destroyed by an external force (such like oscillation) simply. If such structure is used for the arm of a mobile robot, the folding state can be maintained securely even if an inertial force adds.

As to the relation with the joint member of FIG. 32, in order to stretch the joint, the torque for returning to the bending side becomes small at the final point where the arms 2a and 2c are arranged in series. Namely, it is enough to have small force of spring 251f of the stretching assembly 215, and the force for pressing the wheel 215e on the arm 2 always by the spring 215f is decreased, thereby realizing the simple structure of the arm 2 and the stretching assembly 215. When the joint 51 is already stretched, the force of spring member 215f is always internal force for the claw 216c and block 216c of the lock member 216. Namely, the force of spring member 215f becomes weak and such internal force can be decreased, thereby realizing lightness of lock member 216 in view of strength. As mentioned above, the spring member for never applying the unreasonable force on the joint member can be proposed, further such spring member can realize lightness and long life securely.

Figure 38:
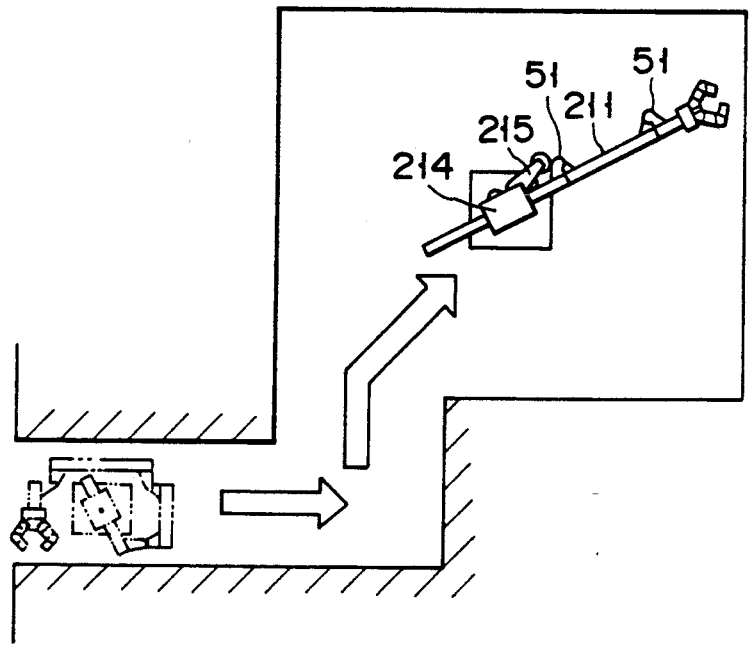
FIG. 38 is a diagram showing another modified example of indirect mechanism.

An other example as to transformed joint member will be explained as follows based on FIG. 38.

In this transformed example, at least more than one (two in the drawing) joint member according to the present invention is provided on a (direct) arm 2 in a cylindrical coordinates robot or polar coordinates robot having a wheel member for running on the floor surface or member for running on the arm. In FIG. 38, the same portion as that in FIG. 32 has the same mark. The arm 2 is folded before entering into the narrow entrance and the robot is huddled up itself. The huddled robot enters into the narrow entrance using the member for running while keeping a small size. The joint 51 is stretched by the stretching assembly 215 while making the arm 2 go forward and backward, to make it one straight arm 2. The arm 2 is used as the direct arm of the cylindrical coordinates robot or the polar coordinates robot. After the working of the robot completes, the joint 51 is folded again and the robot is huddled up itself, and the robot goes out from the narrow exit.

According to the above structure, since the robot can enter into the narrow entrance by folding the long arm 2 thereof and opens such arm in innerside to work. It is very effective for the case of where the wide range of working space in the innerside is needed. In addition thereto, since the joint is light, the carriage 1 for moving the arm is simpler in structure in comparison with that having a driving source at a joint portion.

Figure 39:
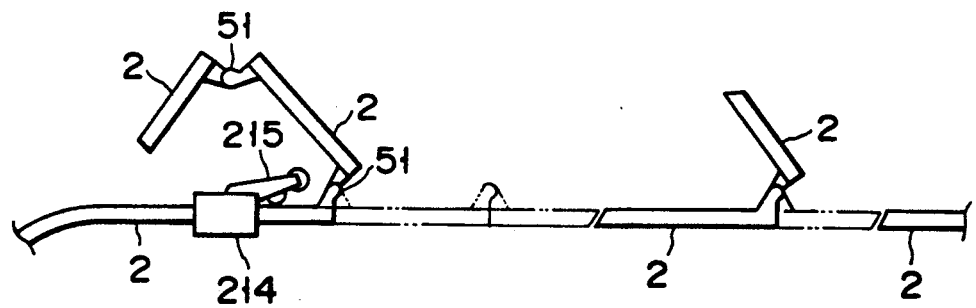
FIG. 39 is a diagram showing a still different modified example of the joint mechanism.

A still other example as to the transformed joint member is explained based on FIG. 39.

In this example, at least more than one joint member according to the present invention is provided on the arm 2 as the switching mechanism of arm in a unit for running on the arm 2 for checking and so on. The carriage 1 runs on the arm 2 and connects the arm 2 to joint 51 by stretching the joint 51 (as shown by two dots line). After the working of such like checking completes, the carriage 1 folds the joint 51 and returns to a standby position.

According to the above structure, it is possible to fold specific point of arm 2 without any interference with the other device's movement.

According to the above mentioned joint member, since the carriage runs on the arm, the running mechanism of the carriage can stretch the joint which is bent in normal state. Further, the arm which is arranged in series is fixed by the lock member, and if the lock member is detached by the release member, the joint is bent by the spring member attached to the joint. However, since these above movements work in accordance with the carriage movement, it is needless to have a driving source at the joint portion. Therefore, the drawing of cable to the driving source at the joint portion is not needed, thereby realizing miniaturization and compactness of joint. Further, since the elastic force is used for the member for stretching bent arm, any unreasonable force does not occur in the stretching member or track, thereby obtaining mechanical reliability and long life. Furthermore, as a member attached to the side of carriage, since only a stretching member without power and one release member having simple structure of, for example, pushing out the lever, can operate a plurality of joints, it will be more advantageous in proportion as the number of needed joints increases.

According to the above mentioned invention, since it is possible to climb over the cable holding metal fittings such as strain insulators and clamps attached to the overhead line and it is possible to detour around the tower, it is also possible to carry the checking/monitoring unit such as television camera alongside the overhead line continuously. Accordingly, it is needless to make a sling change working of the apparatus every short section of line as in the conventional art, thereby achieving the maintenance/checking work of overhead line effectively.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus for tracking an overhead line supported by a tower comprising:
   carriage means slung over said overhead line;
   an arm member movably mounted on said carriage means, and having at least two arm tip ends, said carriage means and said arm member being movable relative to each other;

at least two hook means attached to the arm tip ends of said arm member and adapted to sling the arm member from said overhead line;

wherein said carriage means comprises:

a shaft member rotatable and vertically movable relative to said carriage and having top and bottom end portions;

swingable arm means swingably connected to the top end portions of said shaft member and having at least two tip portions;

a pair of wheels rotatably disposed at said tip portions of said swingable arm means and being capable of running on said overhead line by slinging over said overhead line;

clamp means for clamping said wheels on said overhead line; and means for moving said arm member so that said arm member moves around said tower and the arm tip ends of said arm member are slung from said overhead line with the tower being positioned between the arm tip ends of said arm member, and for moving said carriage means along said arm member slung from said overhead line by means of the arm tip ends so as to move it around said tower.

2. The apparatus for tracking an overhead line according to claim 1, wherein said arm member comprises an arc shape arm having a curvature for permitting said arm to move around said tower.

3. The apparatus for tracking an overhead line according to claim 2, wherein said arc shape arm comprises a plurality of arm parts and joint means for connecting said arm parts flexibly so that said arc shape arm is bent inside when said carriage means moves along said tower and said arc shape arm bent inside is moved outwardly when said arc shape arm moves around said tower.

4. The apparatus for tracking an overhead line according to claim 3, wherein said arm parts comprise a center arm part, two side arm parts provided at both ends of said center arm part, and said joint means includes two joint members each connecting said center arm part and one of said side arm parts flexibly.

5. The apparatus for tracking an overhead line according to claim 4, wherein each of said joint members contains a spring member for applying to said side arm part a force for bending a corresponding one of said side arm parts inwardly toward said center arm part, and said carriage means contains a member for stretching said bent side arm parts in a direction away from said center arm part.

6. The apparatus for tracking an overhead line according to claim 5, wherein each of said joint members contains a lock member for locking the corresponding one of said side arm parts in a stretched state when said side arm parts are stretched and a release member for releasing such lock.

7. The apparatus for tracking an overhead line according to claim 4, wherein said joint members comprises a joint for rotatably connecting said center arm part with the corresponding one of said side arm parts and a wire elastically stretched between said center arm part and the corresponding one of said side arm parts and winding around said joint when said side arm parts stretch.

8. The apparatus for tracking an overhead line according to claim 1, wherein said clamp means comprises link means swingably attached to said swingable arm means, clamp roller means rotatably supported by said link means, and means for pressing said clamp roller means on said wheels in order to clamp said overhead line.

9. The apparatus for tracking an overhead line according to claim 8, wherein said link means is fixed to said swingable arm means, and comprises four links connected to each other so as to form one quadrangle, which include a first link having a stop means and a second link abutted on said stop means for inhibiting rotation to a predetermined direction more than a predetermined angle and is supported by said swingable arm means rotatably.

10. The apparatus for tracking an overhead line according to claim 1, wherein said carriage means has a driving gear and a driving means for rotating said driving gear, said arm member is curved with a predetermined curvature and contains a side surface on which a rack gear is formed, said rack gear is engaged with said driving gear provided on said carriage means, and said arm is moved by the rotation of said driving gear.

11. The apparatus for tracking an overhead line according to claim 1, wherein each of said hook means comprises an upstanding part projecting from the corresponding arm tip end of said arm member, a horizontal part provided at a top end of said upstanding part in parallel with said arm member, a hook provided at a tip end of said horizontal part, and a taper stopper rotatably provided at an entrance of said hook and having a self-locking mechanism.

12. The apparatus for tracking an overhead line according to claim 1, wherein said carriage means has swinging means for swinging said swingable arm means forward and backward in order that said wheels can ride over an obstacle on said overhead line.

13. The apparatus for tracking an overhead line according to claim 1, wherein said arm member is movably mounted on said bottom end portion.

14. The apparatus for tracking an overhead line according to claim 1, wherein said carriage means includes balance means mounted on said bottom end portion and horizontally movable for balancing said carriage means in accordance with movement of said arm member.

15. An overhead line automatic checking equipment for automatically checking an overhead line supported by a tower, comprising:

an elevator for moving up and down said tower;

a carriage slung over said overhead line;

an arm member movably mounted on said carriage and having at least two arm tip portions;

a perch member provided on said elevator; and at least two hook means detachable from said perch member and said overhead line, which are attached to the arm tip portions of said arm member, respectively;

wherein said carriage comprises:

a shaft member rotatable and vertically movable relative to said carriage and having top and bottom ends;

a swingable arm member swingably attached to the top end of said shaft member and having at least two tip portions;

a pair of wheels rotatably attached to said tip portions of said swingable arm member and being capable of hooking over said perch member and said overhead line and of running on said overhead line;

means for moving said arm member so that said arm member moves around said tower and the arm tip ends of said arm member are slung from said overhead line with the tower being positioned between the arm tip ends of said arm member, and for moving said carriage means along said arm member slung from said overhead line by means of the arm tip ends so as to move it around said tower;

wherein said carriage moves said arm member slung between said overhead line and said perch member when said wheels are detached from said perch member.

16. An apparatus for tracking an overhead line comprising:

carriage means slung over said overhead line;

an arm member movably mounted on said carriage means and having at least two arm tip ends, said carriage means and said arm member being movable relative to each other, and said arm member having an arc shape, said arm member being bendable inwardly and stretchable outwardly; and at least two hook means attached to the arm tip ends of said arm member and adapted to sling the arm member from said overhead line;

wherein said carriage means comprises:

a shaft member rotatable and vertically movable and having top and bottom end portions;

swingable arm means swingably connected to the top end portions of said shaft member and having at least two tip portions;

a pair of wheels rotatably disposed at said tip portions of said swingable arm means and being capable of running on said overhead line by slinging over said overhead line; and clamp means for clamping said wheels on said overhead line.

17. The apparatus for tracking an overhead line according to claim 16, wherein said arm member comprises a center arm part having two ends and said side arm parts connected to the ends of said center arm part respectively.

18. An apparatus for tracking an overhead line, comprising:

carriage means slung over said overhead line;

an arm member movably mounted on said carriage means, and having at least two arm tip ends, said carriage means and said arm member being movable relative to each other;

at least two hook means attached to the arm tip ends of said arm member and adapted to sling the arm member from said overhead line;

wherein said carriage means comprises;

a shaft member rotatable and vertically movable and having top and bottom end portions;

swingable arm means swingably connected to the top end portions of said shaft member and having at least two tip portions;

a pair of wheels rotatably disposed at said tip portions of said swingable arm means and being capable of running on said overhead line by slinging over said overhead line; and clamp means for clamping said wheels on said overhead line, said clamp means comprising link means swingably attached to said arm member, clamp roller means rotatably supported by said link member, and means for pressing said clamp roller means on said wheels in order to clamp said overhead line, wherein said link means comprises four links connected to each other so as to form a quadrangle, which links include a first link having stop means and a second link abutted on said stop means for inhibiting rotation in a predetermined direction by more than a predetermined angle and is rotatably supported by said swingable arm means.

19. An apparatus for tracking an overhead line supported by a tower, comprising:

carriage means slung over said overhead line, said carriage means having a driving gear and driving means for rotating said driving gear, said arm member being curved with a predetermined curvature and containing a side surface on which a rack gear is formed, said rack gear being engaged with said driving gear provided on said carriage means;

an arm member movably mounted on said carriage means, and having at least two arm tip ends, said carriage means and said arm member being movable relative to each other, said arm member being moved by the rotation of said driving gear;

at least two hook means attached to the arm tip ends of said arm member and adapted to sling the arm member from said overhead line;

wherein said carriage means comprises;

a shaft member rotatable and vertically movable and having top and bottom end portions;

swingable arm means swingably connected to the top end portions of said shaft member and having at least two tip portions;

a pair of wheels rotatably disposed at said tip portions of said swingable arm means and being capable of running on said overhead line by slinging over said overhead line; and clamp means for clamping said wheels on said overhead line.

20. An apparatus for tracking an overhead line, comprising:

carriage means slung over said overhead line;

an arm member movably mounted on said carriage means and having at least two arm tip ends, said carriage means and said arm member being movable relative to each other;

at least two hook means attached to the arm tip ends of said arm member and adapted to sling the arm member from said overhead line, each of said hook means comprising an upstanding part projecting from the corresponding arm tip end of said arm member, a horizontal part provided at a top end of said upstanding part in parallel with said arm member, a hook provided at a tip end of said horizontal part, and a taper stopper provided at an entrance of said hook rotatably and having a self-locking mechanism;

wherein said carriage means comprises;

a shaft member rotatable and vertically movable and having top and bottom end portions;

swingable arm means swingably connected to the top end portions of said shaft member and having at least two tip portions;

a pair of wheels rotatably disposed at said tip portions of said swingable arm means and being capable of running on said overhead line by slinging over said overhead line; and clamp means for clamping said wheels on said overhead line.

21. An apparatus for tracking an overhead line, comprising:

carriage means slung over said overhead line;

an arm member movably mounted on said carriage means and having at least two arm tip ends, said carriage means and said arm member being movable relative to each other;

at least two hook means attached to the arm tip ends of said arm member and adapted to sling the arm member from said overhead line, said arm member being relatively movable with said carriage means and comprising a center arm part, said side arm parts provided at both ends of said center arm part, and a joint member for connecting said center arm part and said side arm parts flexibly;

wherein said carriage means comprises;

a shaft member rotatable and vertically movable and having top and bottom end portions;

swingable arm means swingably connected to the top end portions of said shaft member and having at least two tip portions;

a pair of wheels rotatably disposed at said tip portions of said swingable arm means and being capable of running on said overhead line by slinging over said overhead line; and clamp means for clamping said wheels on said overhead line.

22. The apparatus for tracking an overhead line according to claim 21, wherein said joint member contains a spring member for applying to said side arm parts a force for bending said side arm parts inwardly toward said center arm part, and said carriage means contains a member for stretching said bent side arm parts in a direction away from said center arm part.

23. The apparatus for tracking an overhead line according to claim 22, wherein said joint member contains a lock member for locking said side arm parts in the stretching state when said side arm parts are stretched and a release member for releasing said lock member.

24. The apparatus for tracking an overhead line according to claim 21, wherein said joint member comprises a joint for rotatably connecting said center arm part with said side arm parts and a wire elastically stretched between said center arm part and one of said side arm parts and winding around said joint when said side arm parts stretch.

25. An apparatus for tracking an overhead line, comprising:

carriage means slung over said overhead line;

an arm member movably mounted on said carriage means and having at least two arm tip ends, said carriage means and said arm member being movable relative to each other;

at least two hook means attached to the arm tip ends of said arm member and adapted to sling the arm member from said overhead line;

wherein said carriage means comprises;

a shaft member rotatable and vertically movable and having top and bottom end portions;

swingable arm means swingably connected to the top end portions of said shaft member and having at least two tip portions;

a pair of wheels rotatably disposed at said tip portions of said swingable arm means and being capable of running on said overhead line by slinging over said overhead line; and clamp means for clamping said wheels on said overhead line, wherein said carriage means has swinging means for swinging said swingable arm means forward and backward in order that said wheels can ride over an obstacle on said overhead line, said swinging means being movably attached to said swingable arm means and coupled to balance means for moving a center of gravity of said swingable arm means in order to move said wheels upward and downward.

* * * * *